United States Patent
Livanec et al.

(10) Patent No.: US 9,587,158 B2
(45) Date of Patent: Mar. 7, 2017

(54) TREATMENT OF SUBTERRANEAN FORMATIONS USING A COMPOSITION INCLUDING A LINEAR TRIBLOCK COPOLYMER AND INORGANIC PARTICLES

(71) Applicant: Halliburton Energy Services, Inc., Houston, TX (US)

(72) Inventors: Philip Wayne Livanec, Deer Park, TX (US); Matthew Lynn Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 305 days.

(21) Appl. No.: 13/874,137

(22) Filed: Apr. 30, 2013

(65) Prior Publication Data
US 2014/0323361 A1 Oct. 30, 2014

(51) Int. Cl.
| | | |
|---|---|---|
| C09K 8/46 | (2006.01) | |
| C09K 8/035 | (2006.01) | |
| C09K 8/92 | (2006.01) | |
| C09K 8/467 | (2006.01) | |
| C09K 8/516 | (2006.01) | |
| C09K 8/70 | (2006.01) | |
| C08L 53/00 | (2006.01) | |
| C04B 24/16 | (2006.01) | |
| C04B 24/32 | (2006.01) | |
| C04B 28/02 | (2006.01) | |
| C04B 28/06 | (2006.01) | |
| C04B 28/14 | (2006.01) | |
| C08F 293/00 | (2006.01) | |
| E21B 43/00 | (2006.01) | |

(52) U.S. Cl.
CPC ............ *C09K 8/035* (2013.01); *C04B 24/166* (2013.01); *C04B 24/32* (2013.01); *C04B 28/02* (2013.01); *C04B 28/06* (2013.01); *C04B 28/14* (2013.01); *C08F 293/005* (2013.01); *C08L 53/00* (2013.01); *C09K 8/467* (2013.01); *C09K 8/516* (2013.01); *C09K 8/70* (2013.01); *C09K 8/92* (2013.01); *C08F 2438/01* (2013.01); *C09K 2208/10* (2013.01); *E21B 43/00* (2013.01); *Y02W 30/92* (2015.05); *Y02W 30/94* (2015.05)

(58) Field of Classification Search
CPC . C09K 8/68; C09K 8/685; C09K 8/80; C09K 2208/10; C09K 8/90; C09K 8/032; C09K 8/588; C09K 8/805; C09K 8/035; C09K 8/584; C09K 8/88; C09K 2208/08; C09K 2208/30; C09K 8/50; C09K 8/516; C09K 8/52; C09K 2208/00; C09K 8/08; C09K 8/32; C09K 8/473; C09K 8/487; C09K 8/514; C09K 8/03; C09K 8/512; C09K 8/602; C09K 8/703; C09K 8/38; C09K 8/502; C09K 8/536; C09K 8/426; C09K 8/46; C09K 8/48; C09K 8/501; C09K 8/506; C09K 8/5083; C09K 8/518; C09K 8/594; C09K 8/60; C09K 8/72; C09K 8/887; C09K 8/92; C09K 8/94; E21B 43/267; E21B 33/13
See application file for complete search history.

(56) References Cited

U.S. PATENT DOCUMENTS

| | | | |
|---|---|---|---|
| 3,378,073 A | 4/1968 | Savins | |
| 4,212,747 A | 7/1980 | Swanson et al. | |
| 5,076,359 A | 12/1991 | Yeh | |
| 5,103,909 A | 4/1992 | Morgenthaler et al. | |
| 2006/0258543 A1* | 11/2006 | Saini ....................... | C09K 8/12 507/219 |
| 2010/0071893 A1 | 3/2010 | Caritey et al. | |
| 2013/0220608 A1* | 8/2013 | Rincon-Torres ......... | C09K 8/70 166/285 |

OTHER PUBLICATIONS

M. Lemmers, E. Spruijt, S. Akerboom et. al. Physical gels based on charge driven bridging of nanoparticles by triblock copolymers, Langmuir, 2012, 28, 12311-12318 (supporting documents).*
http://www.glossary. oilfield.slb.com/ Terms/s/spacer_fluid.aspx downloaded on Jun. 28, 2016.*
M. Lemmers, E. Spruijt, S. Akerboom et. al. Physical gels based on charge driven bridging of nanoparticles by triblock copolymers, Langmuir, 2012, 28, 12311-12318.*
Lemmers, M., et al., "Physical Gels based on Charge-Driven Bridging of Nanoparticles by Triblock Copolymers: Supporting Information", (2012), 1-16.
Lemmers, M., et al., "Physical Gels Based on Charge-Driven Bridging of Nanoparticles byTriblock Copolymers", Langmuir,28, (2012), 12311-12318.
"International Application Serial No. PCT/US2014/034013, International Search Report mailed Aug. 27, 2014", 3 pgs.
"International Application Serial No. PCT/US2014/034013, Written Opinion mailed Aug. 27, 2014", 7 pgs.
"Australian Application Serial No. 2014260408, First Examiner Report mailed Sep. 3, 2015", 3 pgs.
"International Application Serial No. PCT/US2014/034013, International Preliminary Report on Patentability mailed Nov. 12, 2015", 9 pgs.

(Continued)

*Primary Examiner* — Kumar R Bhushan
(74) *Attorney, Agent, or Firm* — Tenley Krueger Tumey LLP

(57) ABSTRACT

The present invention relates to treatment of subterranean formations using compositions that experience an increase in viscosity as a result of the application of heat or shear. In various embodiments, the present invention provides a method of treating a subterranean formation. The method can include obtaining or providing a composition including a linear triblock copolymer and inorganic particles. The method can include at least one of shearing and heating the composition, to increase the viscosity thereof. The method can also include contacting the composition with a subterranean material downhole.

20 Claims, 8 Drawing Sheets

(56) References Cited

OTHER PUBLICATIONS

"Norway Application Serial No. 20151061, Office Action mailed Oct. 5, 2015", 2 pgs.
"Australian Application Serial No. 2014260408, Amendment filed Dec. 26, 2015 in response to First Examiner Report mailed Sep. 3, 2015", 24 pgs.
"Australian Application Serial No. 2014260408, Subsequent Examiners Report mailed Jan. 5, 2016", 3 pgs.
"Norway Application Serial No. 20151061, Response filed Jan. 4, 2016 to Office Action mailed Oct. 5, 2015", (w/ English Translation of Claims), 8 pgs.

* cited by examiner

TREATMENT OF SUBTERRANEAN FORMATIONS USING A COMPOSITION INCLUDING A LINEAR TRIBLOCK COPOLYMER AND INORGANIC PARTICLES

BACKGROUND OF THE INVENTION

During the drilling, completion, and production phases of wells for petroleum or water extraction, the downhole use of compositions having high viscosities, including gels, is important for a wide variety of purposes. Higher viscosity fluids can more effectively carry materials to a desired location downhole, such as proppants. Similarly, higher viscosity drilling fluids can more effectively carry materials away from a drilling location downhole. High viscosity fluids and gels can be useful as packer fluids inserted in the annulus between the tubing and casing above a packer to lower pressure differential across the packer and on the wellbore and casing. High viscosity fluids and gels can be useful as a barrier pill to help manage pressure generated downhole. High viscosity materials and gels can be useful as lost circulation materials, which can help mitigate the loss of drilling fluids to formations downhole. In another example, the viscosity of the fluid used to perform induced hydraulic fracturing can alter the types of fractures formed in the subterranean formation; higher viscosity fluids generally form large dominant fractures, while lower-viscosity fluids generally cause smaller distributed fractures.

Past techniques can offer less control over the viscosity of a fluid than needed to achieve an ideal viscosity for particular operations. In addition, past techniques can require pumping of high-viscosity fluids to a desired location downhole, which can be energy intensive and difficult. Pumping gels to a desired location can be difficult or impossible.

SUMMARY OF THE INVENTION

In various embodiments, the present invention provides a method of treating a subterranean formation. The method includes obtaining or providing a composition including a linear triblock copolymer and inorganic particles. The composition has a viscosity. The method includes at least one of shearing and heating the composition. The shearing or heating of the composition increases the viscosity of the composition. The method also includes contacting the composition with a subterranean material downhole.

In various embodiments, the present invention provides a method of treating a subterranean formation. The method includes obtaining or providing a composition including a linear triblock copolymer and inorganic particles. The composition has a viscosity. The method includes at least one of shearing and heating the composition. The shearing and heating of the composition increases the viscosity of the composition. The method also includes contacting the composition with a subterranean material downhole. The linear triblock copolymer has the structure A-$L^1$-B-$L^1$-A. The variable $L^1$ is —OC(O)—C($R^1$)$_2$—. The variable $R^1$ is $C_1$-$C_{10}$ alkyl. The variable A at each occurrence is independently selected from the group consisting of —(C$R^3$$R^4$—C($R^3$)$_2$)$_n$—, —(C($R^3$)$_2$—C$R^3$$R^4$)$_n$—, and —[{C$R^3$$R^4$—C($R^3$)$_2$}$_{n1}$ {C($R^3$)$_2$—C$R^3$$R^4$}$_{n2}$]—. The variable $R^3$ at each occurrence is independently selected from the group consisting of H and $C_1$-$C_{10}$ alkyl. The variable $R^4$ is -$L^2$-$R^5$-$R^6$. The variable $L^2$ is —C(O)O—, wherein the terminal oxygen atom is directly bound to $R^5$. The variable $R^5$ is independently at each occurrence $C_1$-$C_{10}$ alkylene. The variable $R^6$ is —$N^+$($R^7$)$_3$, wherein $R^7$ is independently at each occurrence $C_1$-$C_{10}$ alkyl. The variable B is selected from the group consisting of a poly(alkylene oxide) block having the structure —($R^2$—O)$_m$—$R^2$—, wherein $R^2$ is a $C_1$-$C_{10}$ alkylene group, and a polymerized $C_4$-$C_{10}$ dialkene block, wherein the $C_4$-$C_{10}$ dialkene has at least two double bonds conjugated to one another. The variable m is about 10 to about 1000. The variable n is about 2 to about 500. The variable n1+n2 is n.

In various embodiments, the present invention provides a method of treating a subterranean formation. The method includes obtaining or providing a composition including a linear triblock copolymer and inorganic particles. The composition has a viscosity. The method includes at least one of shearing and heating the composition. The shearing and heating of the composition increases the viscosity of the composition. The method also includes contacting the composition with a subterranean material downhole. The inorganic particles include polyvinylpyrrolidone-coated silica particles having a diameter of about 0.1 nm to about 100 nm. The linear triblock copolymer has the structure A-$L^1$-B-$L^1$-A. The variable $L^1$ is —OC(O)—C(CH$_3$)$_2$—, wherein the terminal oxygen atom is directly bound to the B block. The variable A at each occurrence is independently selected from the group consisting of $R^8$—(C(CH$_3$)$R^4$—CH$_2$)$_n$—, $R^8$—(CH$_2$—C(CH$_3$)$R^4$)$_n$—, and $R^8$—[{C(CH$_3$)$R^4$—CH$_2$}$_{n1}$ {C($R^3$)$_2$—C(CH$_3$)$R^4$}$_{n2}$]—. The variable $R^4$ is -$L^2$-$R^5$-$R^6$. The variable $L^2$ is —C(O)O—, wherein the terminal oxygen atom is directly bound to $R^5$. The variable $R^5$ is ethylene. The variable $R^6$ is —$N^+$(CH$_3$)$_3$. The variable $R^8$ is independently at each occurrence selected from the group consisting of H, Br, Cl, I, F, a substituted or unsubstituted organic group, and an A block from the same or from another linear triblock copolymer optionally with —O—O— disposed therebetween. The variable B is a poly(alkylene oxide) block having the structure —($R^2$—O)$_m$—$R^2$—, wherein $R^2$ is selected from the group consisting of an ethylene group and a propylene group. The variable m is about 10 to about 1000. The variable n is about 2 to about 500. The variable n1+n2 is n.

In various embodiments, the present invention provides a method of treating a subterranean formation. The method includes obtaining or providing a composition including a linear triblock copolymer and inorganic particles. The composition has a viscosity. The method includes at least one of shearing and heating the composition. The shearing and heating of the composition increases the viscosity of the composition. The method also includes contacting the composition with a subterranean material downhole. The inorganic particles include polyvinylpyrrolidone-coated silica particles having a diameter of about 0.1 nm to about 100 nm. The linear triblock copolymer includes the structure

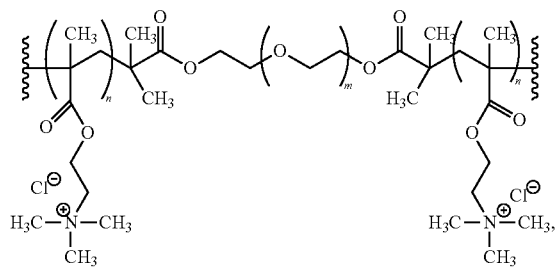

The variable m is about 10 to about 1000. The variable n is about 2 to about 500.

In various embodiments, the present invention provides a method of treating a subterranean formation. The method includes obtaining or providing a composition that is at least one of a shear-thickenable, heat-thickenable, shear-thickened, and heat-thickened. The composition includes a linear triblock copolymer and inorganic particles. The method also includes contacting the composition with a subterranean material downhole.

In various embodiments, the present invention provides a composition for treatment of a subterranean formation. The composition includes at least one polymer including a linear triblock copolymer and inorganic particles. The composition also includes a drilling fluid, stimulation fluid, fracturing fluid, spotting fluid, clean-up fluid, production fluid, completion fluid, remedial treatment fluid, abandonment fluid, pill, acidizing fluid, a cementing fluid, a packer fluid, or a combination thereof. In some embodiments, the composition is at least one of shear-thickened, heat-thickened, shear-thickenable, and heat-thickenable.

In various embodiments, the present invention provides a method for preparing a composition for treating a subterranean formation. The method includes obtaining or providing a composition including a linear triblock copolymer and inorganic particles. The composition has a viscosity. The method includes applying at least one of heat and shear to the composition, to increase the viscosity of the composition. In some embodiments, the method further includes combining the composition, before or after the heating or shearing, with at least one of a drilling fluid, stimulation fluid, fracturing fluid, spotting fluid, clean-up fluid, production fluid, completion fluid, remedial treatment fluid, abandonment fluid, pill, acidizing fluid, a cementing fluid, a packer fluid, and a combination thereof.

Various embodiments of the present invention provide certain advantages over other downhole fluids and methods of using the same, at least some of which are unexpected. In various embodiments, by varying any one or more of the structure of the linear triblock copolymer, the concentration of the triblock copolymer, the concentration of the inorganic particles, and the presence of additives in the composition, the viscosity of the composition can be more precisely controlled than other high viscosity fluids. In various examples, by applying at least one of heat and shear to the composition including the linear triblock copolymer and the inorganic particles, the viscosity or gelation of the composition can advantageously be increased more easily and conveniently than the viscosity of other fluids. In various examples, by applying heat or shear on the surface, the viscosity can be raised prior to placing the composition downhole.

Most high viscosity liquids must be pumped to a desired location, which is energy intensive and inconvenient. However, in an embodiment of the present invention, by applying heat or shear downhole, the viscosity or gelation can be conveniently increased downhole, at least partially avoiding the difficulty and expense of pumping a highly viscous fluid to a downhole location.

In various embodiments, the ability of the composition to increase in viscosity or gel as a result of shear or heat can allow the viscosity of the composition to be raised conveniently using events controllable from the surface when the composition is in or near to the downhole location where a higher viscosity material is desired. In some examples, the composition can be selectively agitated or heated at a downhole location, such as by bubbling gases through the composition or by using other suitable downhole agitation methods, conveniently increasing the viscosity of the composition or gelling the composition at a desired location at a desired time.

In various examples, the ability of the composition including the linear triblock copolymer and the inorganic particles to increase in viscosity or gel as a result of shear or heat can operate synergistically with various operations performed during the drilling, completion, and production phases of wells for petroleum or water extraction. In some embodiments, the agitation caused by pumping the composition downhole can conveniently cause the viscosity to increase or can cause gelling. For example, the heat provided by a downhole formation can increase the viscosity of the composition or cause gelation, such as when using the composition as a packer fluid or a component thereof, making it function more effectively. In some examples, when used as a drilling fluid or a component thereof, the agitation caused by drilling can cause the viscosity of the composition to advantageously increase or can cause gelation to occur. In some examples, an increase in viscosity or gelation during drilling can allow the composition to function as a lost circulation material and can help prevent or lessen the loss of drilling fluids to a downhole formation. In some embodiments, by using the composition as a barrier pill between high and low density fluids, the composition can help to help manage the pressure differential between the fluids more effectively than other high viscosity fluids due to the ability of the composition to increase in viscosity or gelation in response to heat or agitation.

In various examples, by using the composition as a drilling fluid as a drilling fluid or as a component thereof, the composition can advantageously add a level of control and protection against the rapid changes in pressure that can occur during drilling and extraction operations which are associated with agitation or heating activities downhole. In some examples, the increase in viscosity or gelation can occur with substantially no intervention from above the surface outside of normal activities associated with the drilling or extraction activity; events that normally occur downhole during the drilling or extraction operation can be sufficient to trigger the viscosity increase or gelation at useful and advantageous times. In some examples, the movement or change in pressure of petroleum gases or liquids downhole, either directly in contact with the composition or in fluid contact therewith via another medium such as a drilling fluid, can cause the viscosity of the composition to increase or can cause gelation. In some examples, the heating associated with rapid increases in pressure downhole, associated with reaching a highly productive formation, or the heating caused by a sudden release of petroleum materials into the borehole from a formation, can cause the viscosity of the composition to advantageously increase or can cause gelation to occur.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1A:
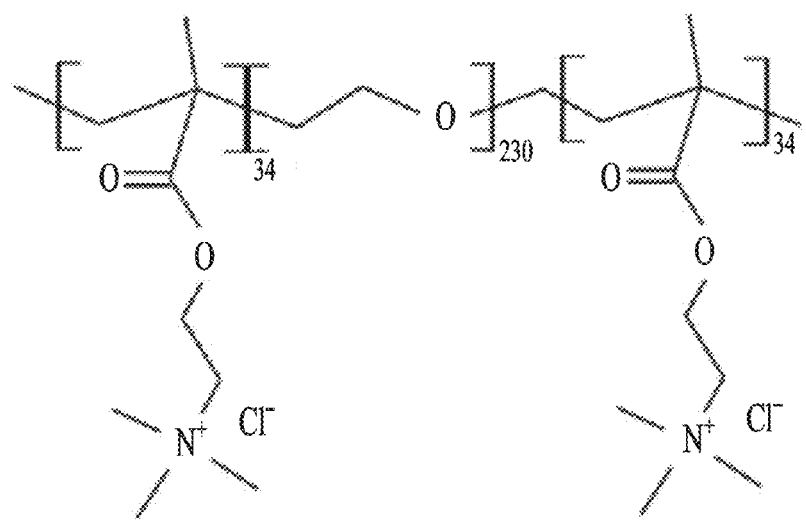
FIG. 1(a) illustrates a triblock copolymer, in accordance with various embodiments of the present invention.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group.

Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C($=$NH)N(R)$_2$, C(O)N(OR)R, or C($=$NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH$=$CH(CH$_3$), —CH$=$C(CH$_3$)$_2$, —C(CH$_3$)$=$CH$_2$, —C(CH$_3$)$=$CH(CH$_3$), —C(CH$_2$CH$_3$)$=$CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C$\equiv$CH, —C$\equiv$C(CH$_3$), —C$\equiv$C(CH$_2$CH$_3$), —CH$_2$C$\equiv$CH, —CH$_2$C$\equiv$C(CH$_3$), and —CH$_2$C$\equiv$C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to R—$NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

In various embodiments, the present invention provides a method of treating a subterranean formation. The method can include obtaining or providing a composition that is at least one of a shear-thickenable, heat-thickenable, shear-thickened, and heat-thickened. The composition can include a linear triblock copolymer and inorganic particles. The method can also include contacting the composition with a subterranean material downhole.

Method of Treating a Subterranean Formation.

In various embodiments, the present invention provides a method of treating a subterranean formation. The method can include obtaining or providing a composition including a linear triblock copolymer and inorganic particles. The method can include at least one of shearing and heating the composition, to increase the viscosity of the composition. The method can include heating without shearing to increase the viscosity. The method can include shearing without heating to increase the viscosity. The method can include both heating and shearing to increase the viscosity. The method can include at least one of contacting the composition with a subterranean material downhole. The subterranean material can be any subterranean material, including any suitable part of the subterranean formation and including equipment placed downhole. In some embodiments, the method includes contacting the subterranean formation and the composition including the linear triblock copolymer and the inorganic particles, such as in some embodiments including use of the composition as a drilling fluid or a component thereof. In other embodiments, the method does not include contacting the subterranean formation and the composition including the linear triblock copolymer, such as in some embodiments including use of the composition as a packing fluid or a component thereof.

In some examples, the shearing or heating to increase the viscosity of the composition can occur before putting the composition downhole. The shearing or heating to increase the viscosity of the composition can occur after putting the composition downhole. The shearing or heating to increase the viscosity of the composition can occur before the contacting with the subterranean material. In some embodiments, the shearing or heating to increase the viscosity of the composition occurs after the contacting with the subterranean material.

The viscosity of the composition prior to the application of shear or heat to the composition can be any suitable viscosity. In some embodiments, the composition prior to shearing or heating can be free-flowing, while in other embodiments the composition can be a thick liquid prior to shearing or heating. In various examples, the viscosity of the composition prior to the application of shear or heat can be about 0.01 cP-500,000 cP, 0.1 cP-100,000 cP, or about 0.2 cP-10,000 cP, measured at standard temperature and pressure. In various examples, the viscosity of the composition prior to the application of shear or heat can be about 0.01 cP, 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, or about 500,000 cP, measured at standard temperature and pressure.

The shearing can be any suitable shearing, such that the viscosity of the composition increases at least to some extent. The shearing can include any method that causes a suitable amount of shear stress in the composition. The shearing can include any movement of the fluid along a solid boundary, or any movement of a solid boundary along the fluid. The shearing can include any suitable type of physical agitation of the fluid, such as vibration, stirring, mixing, pouring, shaking, bubbling one or more gases therethrough, movement of the composition up or down the borehole (e.g., moving the composition in contact with the borehole, drillshaft, casing, or tubing), agitation caused by rotation of a drill head or drill shaft, agitation caused by pumping the composition, or agitation caused by release of petroleum gas or liquid into a borehole. The shearing can include, before or after contacting the composition with the subterranean material, shearing above the surface and shearing in the borehole, only shearing above the surface, or only shearing in the borehole.

The heating can be any suitable heating. The heating can be to any suitable temperature and for any suitable duration of time, such that the viscosity of the composition increases at least to some extent. The heating can be caused by application of heat prior to placing in the borehole via standard heating methods at the surface, such as by use of a heater or oven. The heating can be caused by heat generated by a subterranean formation. The heating can be caused by heat generated by downhole drilling or extraction operations, such as by drilling, such as by friction generated by drilling or other activities. The heating can be caused by release of petroleum liquids or gases from subterranean formations. The heating can be caused by a chemical reaction, such as by materials added to the contents of the borehole designed to heat the composition; the materials can undergo a chemical reaction to create the heat after a time delay or in response to suitable stimuli downhole. The heating can include, before or after contacting with the subterranean material, heating above the surface and heating in the borehole, only heating in the borehole, or only heating above the surface. In some examples, the heating can be heating to about 20° C. to 2000° C., 30° C. to 1000° C., or about 40° C. to 500° C., or to about 30° C. or less, or about 40° C., 50° C., 60° C., 70° C., 80° C., 90° C., 100° C., 125° C., 150° C., 175° C., 200° C., 225° C., 250° C., 275° C., 300° C., 325° C., 350° C., 375° C., 400° C., 450° C., 500° C., 600° C., 700° C., 800° C., 900° C., 1000° C., 1500° C., or to about 2000° C. or higher. In some examples, the heating can occur for a duration of about 1 s to about 1000 h, 30 s to about 100 h, or about 1 min to 10 h, or about 1 s or less, or about 10 s, 20 s, 30 s, 40 s, 50 s, 60 s, 2 min, 3 min, 4 min, 5 min, 10 min, 20 min, 30 min, 40 min, 50 min, 60 min, 1.5 h, 2 h, 3 h, 4 h, 5 h, 6 h, 7 h, 8 h, 9 h, 10 h, 15 h, 20 h, 50 h, 100 h, 500 h, or about 1000 h or more.

The increase in viscosity can be any suitable increase in viscosity. In some examples, the increase in viscosity is a thickening of the composition, e.g., at least one of heat-thickening or shear-thickening. In some examples, the increase in viscosity can be so great that it can be characterized as a gelling of the composition, e.g., heat-gelling or shear-gelling. As used herein, "gel" refers to a solid, jelly-like material that can have properties ranging from soft and weak to hard and tough. Gels can be substantially dilute crosslinked systems, which can exhibit little or no flow. Gels can behave like solids or thick liquids but include predominantly liquid by weight. In some embodiments, the resulting viscosity after shearing or heating the composition, before or after contacting with the subterranean material, can be an intermediate viscosity, wherein the viscosity of the composition can be further increased at a later time. In some embodiments, the resulting viscosity after shearing or heating, before or after contacting with the subterranean material, can be a final viscosity, with little or no further viscosity increase occurring later in the composition. The viscosity of the composition after the heating or shearing can be 0.01 cP to 1,000,000,000 cP or more (e.g., the composition can be a gel having essentially infinite viscosity after the heating or shearing), 1 cP to about 100,000,000, or about 10 cP to about 1,000,000, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, 500,000,000 cP, or about 1,000,000,000 cP or more.

In some embodiments, the increase in viscosity or gelation can be reversible. In other embodiments, the increase in viscosity or gelation can be irreversible. In some embodiments, the gel can be a thixotropic gel.

In various embodiments, the composition that includes the linear triblock copolymer and the inorganic particle can include any one or more additional ingredients. For example, the composition can include water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof. Any one or more components listed in this paragraph can optionally be present or absent from the composition including the linear triblock copolymer and the inorganic particles.

By at least one of adjusting the amount of shearing or heating applied, adding or removing additional ingredients or adjusting the concentration thereof, modifying the chemical structure of the linear triblock copolymer or concentration thereof, altering the type, size, and shape of the inorganic particles, the beginning and ending viscosity of the composition including the linear triblock copolymer and the inorganic particles can be preceisely controlled. Shearing and heating can cause variation in other properties of the composition aside from viscosity. In addition, variation of other parameters, such as those described in this paragraph, can cause variation in other properties of the composition aside from viscosity. In some embodiments, the properties that can be varied and in some embodiments controlled precisely can include density, surface tension of the composition (e.g. intraficial surface tension of an emulsion including the composition), size of the droplets or particles including the composition in an emulsion, stability of an emulsion including the composition, vapor pressure, propensity toward foaming or toward retention of foam, and ease of reversibility of increase in viscosity. By virtue of the shear or heat sensitive viscosity of the composition, the variation of the properties can be advantageously caused to occur prior to the desired use of the composition, or at the location where the particular properties are desired. The variation of the properties can be advantageously caused to occur in a portion of the composition near or at the site where the particular properties are desired, while allowing the properties of the remainder of the composition to remain the same.

Downhole Mixture or Composition.

In various embodiments, at least one of before, during, or after the contacting of the subterranean material and the composition including a linear triblock copolymer and inorganic particles, the composition can be used as a downhole composition, such as any suitable composition used downhole for the drilling, completion, and production phases of a well. For example, in some examples, the composition can be used at least one of alone and in combination with other materials as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof. In some embodiments, the combination of the linear triblock copolymer and the inorganic particle is sufficient to be used as the downhole composition. In some embodiments, other components can be added to the composition including the linear triblock copolymer and the inorganic particles to form the downhole composition. In some embodiments, the composition including the linear triblock copolymer and the inorganic particles can be combined with any suitable downhole fluid such as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid to form a mixture for contacting with the subterranean material. A mixture that is contacted with the subterranean material can include any suitable weight percent of the mixture of the linear triblock copolymer and the inorganic particle, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some examples, the composition including the linear triblock copolymer can be used to modify the viscosity of the drilling fluid or other downhole fluid at a desired time or in a desired place, such as before or after placing the drilling fluid or other fluid downhole, or before, during, or after contacting a subterranean material with the drilling fluid or other fluid. In some embodiments, the composition advantageously allows adjustment of the viscosity or other properties of the drilling fluid or other fluid as needed while the drilling fluid or other fluid is being used. In some examples, the linear triblock copolymer and inorganic particles allows the viscosity or other properties of the drilling fluid or other fluid to be adjusted such that in one or more locations of the borehole the drilling fluid or other fluid including the linear triblock copolymer and inorganic particles has a certain viscosity, while in one or more other locations of the borehole the drilling fluid or other fluid including the linear triblock copolymer and inorganic particles has a different viscosity. For example, during a drilling process, pressure can build up in the borehole due for example to penetration of the drill bit into a particular formation. The agitation or heating from drilling, or agitation or heating from increased flow of petroleum liquids or gases into the borehole, can cause an increase in the viscosity, thus timely preventing the increased pressure from causing a blowout or other undesirable consequences. In another example, during the drilling of porous material such as shale it can be desirable to prevent the influx of drilling fluid into the pores of the material to retain the stability of the material and thus of the stability of the borehole through the material. In some embodiments of the present invention, the viscosity of the drilling fluid proximate to the porous material can be increased to help prevent the influx of drilling fluid into the porous material, and thus preserve the integrity of the borehole A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the mixture. The drilling fluid can be present in the mixture with the copolymer composition in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of a oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 40:60 to about 95:5 by volume of oil phase to water phase. A substantially all oil mud can includes about 100% liquid phase oil by volume; e.g., substantially no internal aqueous phase.

A lost circulation material is a material that can be added to a downhole fluid such as a drilling fluid to reduce or eliminate losses of the drilling fluid to subterranean formations. In various embodiments, the composition including the linear triblock copolymer and inorganic particles can be used as a lost circulation material. In some embodiments, the composition can have a sufficiently high viscosity at the time of addition to the downhole fluid such that that downhole fluid is not lost to the subterranean formation. In some embodiments, the composition is caused to increase in viscosity or gel in a suitable downhole location to prevent the outflux of the downhole fluid to the subterranean formation. In some examples, shearing or heating caused by drilling can cause the composition to increase in viscosity or gel when used as a lost circulation material. In some examples, shearing caused by the outflux of the downhole fluid to the subterranean formation can cause the composition to thicken or gel.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In some examples, the pill is a barrier pill, such as a pill between high density fluid and low density fluid. In some embodiments, a barrier pill including the linear triblock copolymer composition can be used between high density fluid above and low density fluid below, for example when tripping out of the borehole during underbalanced drilling or managed pressure drilling. In some examples, the barrier pill can be caused to thicken or gel before being deposited between the fluids of varying densities. In some embodiments, the barrier pill can thicken or gel in response to pumping, moving up or down the borehole, or in response to agitation or heat caused by the pressure differential between the high and low density fluid.

A packer fluid is a fluid that can be placed in the annular region of a well between the tubing and outer casing above a packer. The packer fluid can provide hydrostatic pressure to lower differential pressure across the sealing element. The packer fluid can lower differential pressure on the wellbore and casing to prevent collapse. The packer fluid can protect metals and elastomers from corrosion. The packer fluid can be an insulating packer fluid that can prevent or reduce heat transfer from the production tubing to the casing or formation. In various examples, a packer fluid including the linear triblock copolymer can be caused to thicken or gel before being deposited in the annular region. In other examples, a packer fluid can thicken or gel in response to heat generated by the subterranean formation, or by agitation, e.g., agitation caused by pumping or movement up or down the borehole.

In some examples, a packer fluid including the linear triblock copolymer can include a polyol, such as ethylene glycol or poly(ethylene glycol), and can be used as an insulating packer fluid.

A cement fluid can include an aqueous mixture of at least one of cement and cement kiln dust. The composition including the linear triblock copolymer can form a useful combination with cement or cement kiln dust, for example by modifying the viscosity or other properties of the cement at a desired time or in a desired place. For example, during the cementing phase of forming a well for petroleum extraction, some or parts of a particular borehole may require a thicker cement to allow the cement to properly set or to behave in another desired manner, while other parts of the borehole may not require as thick of a cement. A thicker cement can be more difficult to pump downhole. Various embodiments of the present invention allow for thickening or gelling of the cement or variation of other properties of the cement near or at the location where the thickened or otherwise modified material is desired. In another example, embodiments allow variation of the viscosity or other properties of the cement pumped downhole, such that a thicker or otherwise modified portion of cement can be placed downhole before, after, or between segments of cements having lower viscosity or other different properties.

The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

Inorganic Particles.

The composition includes a linear triblock copolymer and inorganic particles. The inorganic particles can include any suitable inorganic particles. In some examples, the inorganic particles can include silica, clay, zeolite, Portland cement, pozzolana cement, gypsum cement, high alumina content cement, slag cement, silica cement fly ash, metakaolin, shale, microspheres, pozzolan lime, or a combination thereof. In some embodiments, the inorganic particles are silica particles. The silica can be any suitable silica. For example, the silica can be crystalline silica or amorphous silica.

The inorganic particles can have any suitable size and shape. In some examples, the inorganic particles are nanoparticles. The inorganic particles can be approximately spherical. The inorganic particles can have any suitable diameter, such as a diameter of about 0.000,01 nm to 1 cm, or about 0.000,1 nm to about 10,000 nm, 0.001 nm to about 1000 nm, 0.1 nm to 1000 nm, 0.1 nm to 100 nm, or about 1 nm to 20 nm.

The inorganic particles can include a stabilizer. The stabilizer can be included in the inorganic particles using any suitable process, and the stabilizer can be incorporated into the inorganic particle in any suitable way. In some examples, the inorganic particles are treated with a stabilizer prior to the obtaining or providing of the composition. In some examples, the inorganic particles include a coating of stabilizer. The coating can coat the entire particle, or can coat any suitable fraction of the entirety of the surface area of the particle, such as about 1%, 5%, 20%, 50%, 80%, 90%, 95%, 99%, or about 100% of the surface area of the particle.

The stabilizer can be any suitable stabilizer, such that the shear- or heat-thickenable composition can be formed. In some examples, the stabilizer prevents agglomeration, such as irreversible agglomeration, of the particles. The stabilizer can be an emulsifier or a surfactant. In some embodiments, the stabilizer is a neutral (e.g. having no ionic bonds) hydrophilic polymer. In some examples, the stabilizer includes sodium citrate, gallic acid, sodium dodecyl sulfate, cetyl trimethyl ammonium bromide (CTAB), gelatin, D-sorbitol, polyvinylpyrrolidone (PVP), polyvinyl alcohol (PVA), poly(methylvinylether) (PMVE), or a combination thereof.

Linear Triblock Copolymer.

The composition that is at least one of shear-thickenable, shear-thickened, heat-thickened, and heat-thickenable includes a linear triblock copolymer and inorganic particles. The linear triblock copolymer can be any suitable linear triblock copolymer, such that the composition can be thickened via application of at least one of heat and shear. In some embodiments, the linear triblock copolymer can have the structure $A-L^1-B-L^1-A$. The variable A at each occurrence can independently be a block including at least one ionic group, such as a polyalkenylene block including at least one ionic group. The variable B can be a neutral block, and can help to impart oil-solubility or water-solubility to the polymer. In some examples, B can be a polyalkenylene or poly(alkylene oxide) block. The variable $L^1$ can be a bond or a linking group.

In some examples, $L^1$ can be a covalent bond between the A block and the B block. In some embodiments $L^1$ independently at each occurrence can be chosen from $(C_1-C_{30})$alkylene, —O—$(C_0-C_{30})$alkylene-, —C(O)—$(C_0-C_{30})$alkylene-, —NH—$(C_0-C_{30})$alkylene-, —C(O)O—$(C_0-C_{30})$alkylene-, —OC(O)—$(C_0-C_{30})$alkylene-, —OC(O)O—$(C_0-C_{30})$alkylene-, —C(O)NH—$(C_0-C_{30})$alkylene-, —OC(O)NH—$(C_0-C_{30})$alkylene-, —NHC(O)—$(C_0-C_{30})$alkylene-, and —NHC(O)NH—$(C_0-C_{30})$alkylene-, wherein each $(C_0-C_{30})$alkylene can be independently unsubstituted or further substituted with at least one J. The variable J independently at each occurrence can chosen from F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(S)R, $N(R)C(O)N(R)_2$, N(R)C(S)N(R)_2$, N(C(O)R)C(O)R, N(OR)R, $C(=NH)N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J, wherein R independently at each occurrence can be chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl. In some embodiments, $L^1$ can be —OC(O)—$(C_0-C_{30})$alkylene-, wherein $(C_0-C_{30})$alkylene can be independently unsubstituted or further substituted with at least one J. In some embodiments, $L^1$ can be —OC(O)—$C(R^1)_2$—, wherein $R^1$ at each occurrence can be independently $C_1-C_{10}$ alkyl. In some embodiments, $L^1$ can be —OC(O)—$C(CH_3)_2$—, wherein the terminal oxygen atom can be directly bound to the B block.

In some embodiments, B can be a poly(alkylene oxide) block having the structure —$(R^2—O)_m—R^2$—. The variable $R^2$ can be a $C_1-C_{30}$ alkylene group at each occurrence independently unsubstituted or substituted with at least one J. The variable J independently at each occurrence can be chosen from F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, N(R)C(S)N(R)_2$, N(C(O)R)C(O)R, N(OR)R, $C(=NH)N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J, wherein R independently at each occurrence can be chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl. The variable m can be about 1 to 5000. In some examples, $R^2$ can be an unsubstituted $C_1-C_{10}$ alkylene group. The variable B can be a poly(ethylene oxide). The variable B can be a poly(propylene oxide). The B block can have any suitable degree of polymerization; for example, m can be about 10 to 1000, 100 to about 300, or about 150 to 250.

In some examples, B can be a polymerized $C_4-C_{10}$ dialkene block, wherein the $C_4-C_{10}$ dialkene has at least two double bonds conjugated to one another, wherein the $C_4-C_{10}$ dialkene at each occurrence can be independently unsubstituted or substituted with at least one J. The variable J independently at each occurrence can be chosen from F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N$ $(R)_2$, $SO_3R$, $C(O)R$, $C(O)C(O)R$, $C(O)CH_2C(O)R$, $C(S)R$, $C(O)OR$, $OC(O)R$, $OC(O)OR$, $C(O)N(R)_2$, $OC(O)N(R)_2$, $C(S)N(R)_2$, $(CH_2)_{0-2}NHC(O)R$, $N(R)N(R)C(O)R$, $N(R)N(R)C(O)OR$, $N(R)N(R)C(O)N(R)_2$, $N(R)SO_2R$, $N(R)SO_2N(R)_2$, $N(R)C(O)OR$, $N(R)C(O)R$, $N(R)C(S)R$, $N(R)C(O)N(R)_2$, $N(R)C(S)N(R)_2$, $N(C(O)R)C(O)R$, $N(OR)R$, $C(=NH)N(R)_2$, $C(O)N(OR)R$, and $C(=NOR)R$, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J, wherein R independently at each occurrence can be chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl. The method of claim 41, wherein each B can be chosen from a poly(butadiene) block and a poly(isoprene) block. The B block can have any suitable degree of polymerization, for example, m can be about 1 to 5000, 10 to 1000, 100 to 300, 180 to 280, or about 200 to 260.

In some embodiments, A at each occurrence can be chosen from $-(CR^3R^4-C(R^3)_2)_n-$, $-(C(R^3)_2-CR^3R^4)_n-$, and $-[\{CR^3R^4-C(R^3)_2\}_{n1}\{C(R^3)_2-CR^3R^4\}_{n2}]-$. Herein, the notation of "{ }" indicates that the repeating unit enclosed within the brackets can occur in any order within the block with respect to another repeating unit enclosed within another set of brackets, such as in random distribution, alternating distribution, or any suitable distribution. The variable $R^3$ can be independently at each occurrence $(C_1-C_{30})$hydrocarbyl. The variable $R^3$ at each occurrence can be independently unsubstituted or substituted with at least one J. The variable J independently at each occurrence can be chosen from F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, $C(O)R$, $C(O)C(O)R$, $C(O)CH_2C(O)R$, $C(S)R$, $C(O)OR$, $OC(O)R$, $OC(O)OR$, $C(O)N(R)_2$, $OC(O)N(R)_2$, $C(S)N(R)_2$, $(CH_2)_{0-2}NHC(O)R$, $N(R)N(R)C(O)R$, $N(R)N(R)C(O)OR$, $N(R)N(R)C(O)N(R)_2$, $N(R)SO_2R$, $N(R)SO_2N(R)_2$, $N(R)C(O)OR$, $N(R)C(O)R$, $N(R)C(S)R$, $N(R)C(O)N(R)_2$, $N(R)C(S)N(R)_2$, $N(C(O)R)C(O)R$, $N(OR)R$, $C(=NH)N(R)_2$, $C(O)N(OR)R$, and $C(=NOR)R$, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, wherein R independently at each occurrence can be chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl. The A block can have any suitable degree of polymerization, for example, n can be about 1 to about 5000, 2 to 500, 2 to 200, 2 to 150, 2 to 100, or about 2 to 50. The variable n1+n2 can be equal to n. In some examples, A can be independently at each occurrence chosen from $-(C(CH_3)R^4-CH_2)_n-$, $-(CH_2-C(CH_3)R^4)_n-$, and $-[\{C(CH_3)R^4-CH_2\}_{n1}\{C(R^3)_2-C(CH_3)R^4\}_{n2}]-$.

In some examples, $R^4$ can be $-L^2-R^5-R^6$, wherein $L^2$ can be a linking group. The variable $L^2$ independently at each occurrence can be any suitable linking group, for example, $L^2$ can be chosen from $-O-$, $-C(O)-$, $-NH-$, $-C(O)O-$, $-OC(O)-$, $-OC(O)O-$, $-C(O)NH-$, $-OC(O)NH-$, $-NHC(O)-$, and $-NHC(O)NH-$. The variable $L^2$ can be $-C(O)O-$, wherein the terminal oxygen atom is directly bound to $R^5$. The variable $R^3$ at each occurrence can be chosen from H and $C_1-C_{10}$ alkyl. The variable $R^3$ at each occurrence can be independently chosen from H and methyl. The variable $R^5$ at each occurrence can be independently $C_1-C_{30}$ hydrocarbylene. The variable $R^5$ at each occurrence can be independently unsubstituted or substituted with at least one J, as defined herein for block A. In some embodiments, $R^5$ can be $C_1-C_{30}$ hydrocarbylene, at each occurrence independently unsubstituted or substituted with at least one J as defined herein for block A. The variable $R^5$ can be independently at each occurrence $C_1-C_{10}$ alkylene. The variable $R^5$ can be chosen from ethylene and propylene.

The variable $R^6$ at each occurrence can be independently an ionic group. The variable $R^6$ at each occurrence can be independently chosen from $-N^+(R^7)_3$, $-S(O)_2O^-$, $-C(O)O^-$, $-P(O)(OR^7)O^-$, and $-P(O)O^-$. The variable $R^7$ at each occurrence can be independently chosen from $C_1-C_{10}$ alkyl and H. In some embodiments, $R^6$ is trimethylammonium. The variable $R^6$ can have any suitable counter ion. For example, the counterion can be a halide, such as fluoro, chloro, iodo, or bromo. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than $-1$, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate. In some embodiments, the counterion can be a group I element such as $Na^+$ or $K^+$, $Ag^+$, or can be $NH_4^+$.

In some embodiments, A at each occurrence can be chosen from $R^8-(CR^3R^4-C(R^3)_2)_n-$, $R^8-(C(R^3)_2-CR^3R^4)_n-$, and $R^8-[\{CR^3R^4-C(R^3)_2\}_{n1}\{C(R^3)_2-CR^3R^4\}_{n2}]-$. The copolymer can be terminated in any suitable way, including by linking to its own other end to form a cyclic polymer or by linking to another ABA block copolymer. For example, $R^8$ can be independently at each occurrence chosen from $-H$, $-Br$, $-Cl$, $-I$, $-F$, a substituted or unsubstituted organic group, and an A block from the same or from another linear triblock copolymer optionally with $-O-O-$ disposed therebetween. In some embodiments, $R^8$ can be independently at each occurrence chosen from $-H$, $-Br$, $-Cl$, $-I$, $-F$, $-O-O$., $(C_1-C_{30})$hydrocarbyl, $(C_1-C_{30})$heterocyclyl, $-O-(C_1-C_{30})$hydrocarbyl, $-O-(C_1-C_{30})$heterocyclyl, $-O-O-(C_1-C_{30})$hydrocarbyl, and $-O-O-(C_1-C_{30})$heterocyclyl, wherein $R^8$ at each occurrence are independently unsubstituted or substituted with at least one J. The variable $R^8$ can be independently at each occurrence chosen from H, Br, $CH_3$, pyridyl, phenyl, $-O-CH_3$, $-O$-pyridyl, $-O$-phenyl, $-O-O-CH_3$, $-O-O$-pyridyl, and $-O-O-$ phenyl.

In some embodiments, the linear triblock copolymer can have the structure $A-L^1-B-L^1-A$. The variable $L^1$ can be $-OC(O)-C(R^1)_2-$, wherein $R^1$ can be $C_1-C_{10}$ alkyl. The variable A at each occurrence can be independently chosen from $-(CR^3R^4-C(R^3)_2)_n-$, $-(C(R^3)_2-CR^3R^4)_n-$, and $-[\{CR^3R^4-C(R^3)_2\}_{n1}\{C(R^3)_2-CR^3R^4\}_{n2}]-$. The variable $R^3$ at each occurrence can be independently chosen from H and $C_1-C_{10}$ alkyl. The variable $R^4$ can be $-L^2-R^5-R^6$. The variable $L^2$ can be $-C(O)O-$, wherein the terminal oxygen atom can be directly bound to $R^5$. The variable $R^5$ can be independently at each occurrence $C_1-C_{10}$ alkylene. The variable $R^6$ can be $-N^+(R^7)_3$, wherein $R^7$ at each occurrence can be independently $C_1-C_{10}$ alkyl. The B can be chosen from a poly(alkylene oxide) block having the structure $-(R^2-O)_m-R^2-$, wherein $R^2$ is a $C_1-C_{10}$ alkylene group, and a polymerized $C_4-C_{10}$ dialkene block, wherein the $C_4$-$C_{10}$ dialkene has at least two double bonds conjugated to one another. The variable m can be about 10 to about 1000. The variable n can be about 2 to about 500. The variable n1+n2 can be equal to n.

In some embodiments, the inorganic particles can include polyvinylpyrrolidone-coated silica particles having a diameter of about 0.1 nm to about 100 nm. The linear triblock copolymer can have the structure A-$L^1$-B-$L^1$-A. The variable $L^1$ can be —OC(O)—C(CH$_3$)$_2$—, wherein the terminal oxygen atom is directly bound to the B block. The variable A at each occurrence can be independently chosen from $R^8$—(C(CH$_3$)$R^4$—CH$_2$)$_n$—, $R^8$—(CH$_2$—C(CH$_3$)$R^4$)$_n$—, and $R^8$—[{C(CH$_3$)$R^4$—CH$_2$}$_{n1}$ {C($R^3$)$_2$—C(CH$_3$)$R^4$}$_{n2}$]—. The variable $R^4$ can be -$L^2$-$R^5$-$R^6$. The variable $L^2$ can be —C(O)O—, wherein the terminal oxygen atom can be directly bound to $R^5$. The variable $R^5$ can be ethylene. The variable $R^6$ can be —$N^+$(CH$_3$)$_3$. The variable $R^8$ can be independently at each occurrence chosen from —H, —Br, —Cl, —I, —F, a substituted or unsubstituted organic group, and an A block from the same or from another linear triblock copolymer optionally with —O—O— disposed therebetween. B can be a poly(alkylene oxide) block having the structure —($R^2$—O)$_m$—$R^2$—, wherein $R^2$ can be chosen from an ethylene group and a propylene group. The variable m can be about 10 to about 1000. The variable n can be about 2 to about 500. The variable n1+n2 can be about n.

Method of Preparing a Composition for Treating a Subterranean Formation.

Various embodiments of the present invention provide a method of preparing a composition for treating a subterranean formation. The method can include obtaining or providing the composition including the linear triblock copolymer and the inorganic particles described herein. The method also can include applying at least one of heat and shear to the composition, to increase the viscosity of the composition.

The copolymer can be obtained commercially or can be synthesized in any suitable manner. For example, the starting materials for the polymer (e.g. monomers, or pre-polymerized blocks) can be combined and allowed to react under conditions sufficient for the polymerization to occur. The monomers or pre-polymerized blocks can be obtained commercially or can be synthesized in any suitable manner. Chemical synthesis of the polymer can occur in any suitable manner. In one embodiment, the B block is synthesized or otherwise acquired first, then the A blocks are polymerized on the ends of the B block until the A end-blocks have grown to a suitable size, such as by using atom transfer free radical polymerization.

In some embodiments, the method of preparing a composition for treating a subterranean formation can include combining the composition including the copolymer and inorganic particles with at least one of a drilling fluid, stimulation fluid, fracturing fluid, spotting fluid, clean-up fluid, production fluid, completion fluid, remedial treatment fluid, abandonment fluid, pill, acidizing fluid, a cementing fluid, a packer fluid, and a combination thereof. The combination can occur before or after applying at least one of heat and shear to increase the viscosity of the composition including the copolymer and the inorganic particles.

EXAMPLES

The present invention can be better understood by reference to the following examples which are offered by way of illustration. The present invention is not limited to the examples given herein.

The below Examples appear in Lemmers, M. et al., *Langmuir* 2012, 28, 12311-12318.

Example 1

General

Example 1.1

Triblock Copolymer

The triblock copolymer that was used, PTMAEMA-PEO-PTMAEMA, had a poly(ethylene oxide) middle block and two poly(trimethylaminoethyl methacrylate) end blocks (FIG. 1a). On average, 68 monomers were attached per macroinitiator molecule, as determined by $^1$H NMR (see, FIG. 1c), corresponding to 34 positive charges per end block on average.

Figure 1B:
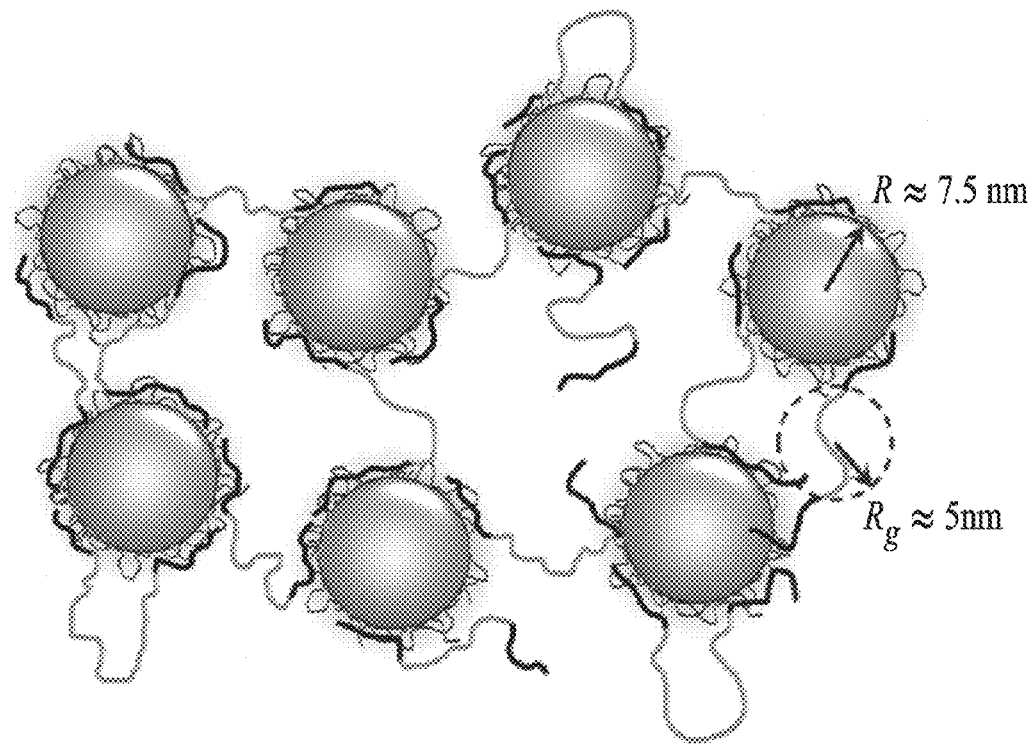
FIG. 1(b) illustrates a schematic drawing of silica nanoparticles connected by triblock copolymers, in accordance with various embodiments of the present invention.
Figure 1C:
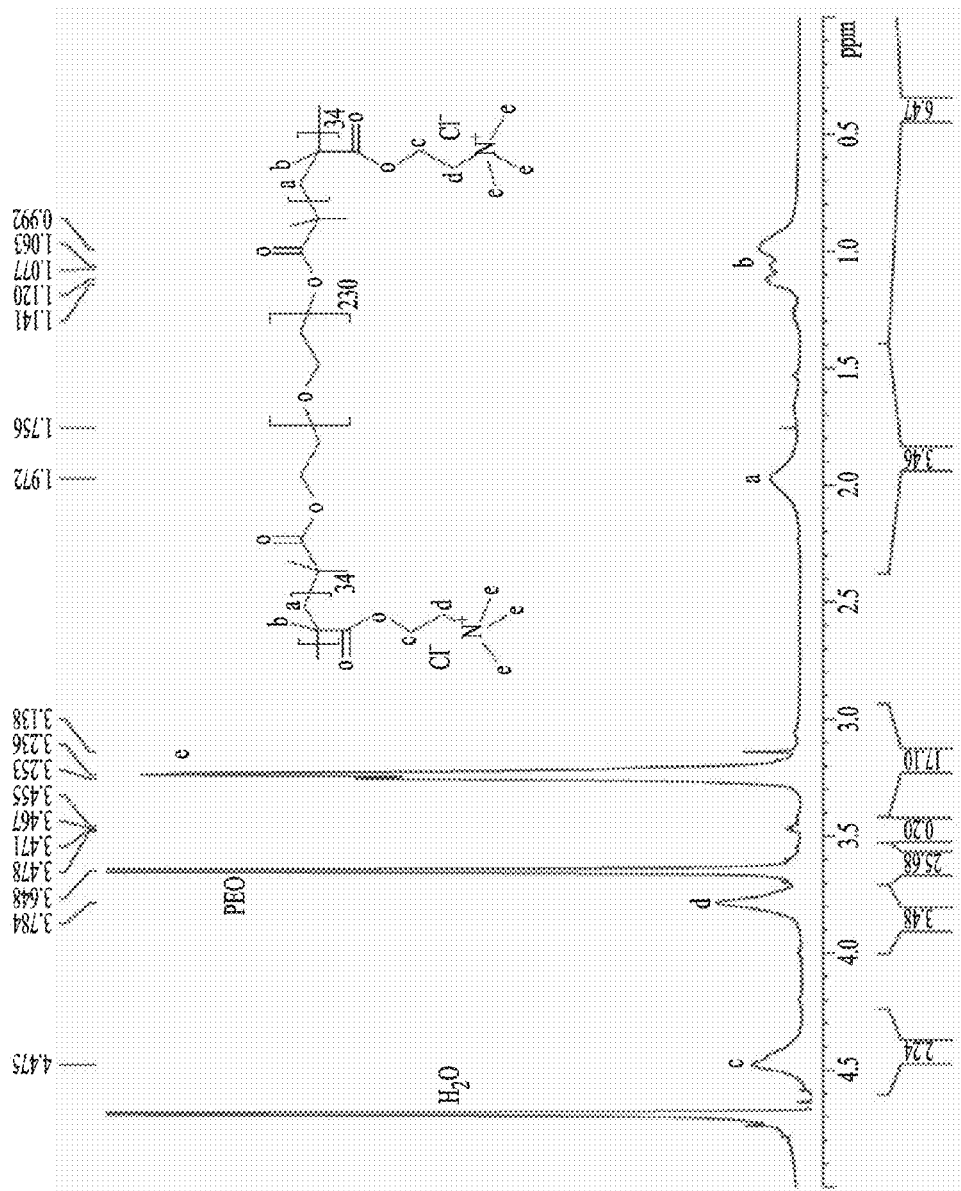
FIG. 1(c) illustrates a $^1$H NMR spectrum of a triblock copolymer, in accordance with various embodiments of the present invention.

FIG. 1(a) illustrates block copolymer PTMAEMA-PEO-PTMAEMA. FIG. 1(b) illustrates a schematic drawing of PVP-coated silica nanoparticles connected by triblock copolymers, forming a transient network. The PEO middle block is drawn in gray, the positively charged end blocks are drawn in black. FIG. 1(c) illustrates a $^1$H-NMR spectrum of the ABA triblock copolymer as synthesized according to the procedure indicated in the experimental section.

Triblock copolymer PTMAEMA-PEO-PTMAEMA was synthesized in two steps. First, poly(ethylene glycol) of $M_n$=10 kg mol$^{-1}$ was used to synthesize a bifunctional macro-initiator based on the method by Jankova et al., *Macromolecules*, 1998, 31, 538-541. In brief, poly(ethylene glycol) of $M_n$=10 kg mol$^{-1}$ (Fluka) was dissolved in toluene. After addition of triethylamine and 2-bromoisobutyryl bromide, the reaction mixture was stirred for five days at 30° C. Purification was performed by treatment with charcoal, filtration, precipitation in petroleum ether, filtration, redissolving in THF and precipitation in petroleum ether (twice), filtration and drying overnight under vacuum. The degree of esterification was 100% as determined by $^1$H-NMR (see, FIG. 1c).

The bifunctional macro-initiator was used to synthesize the triblock copolymer by atom transfer radical polymerization, based on the method described by Li et al., *Macromolecules*, 2003, 36, 8268-8275. In brief, bifunctional macroinitiator, [2-(methacryloyloxy)ethyl]trimethylammonium chloride and bipyridyl were mixed with 2-propanol and deionized water (1:1 v/v). The mixture was stirred at 40° C. while degassing by bubbling argon for 45 minutes. Subsequently, equal molar amounts of Cu(I)Cl and Cu(II)Cl$_2$ were added to start the reaction. After five hours, the reaction was quenched by bubbling oxygen through the mixture. The product was purified by dialysis against deionized water. The product was obtained by freeze-drying overnight. The yield by weight was 73% (20 g). On average 68 monomers were attached per macro-initiator molecule, as determined by $^1$H-NMR (see FIG. 1c), corresponding to 34 positive charges per end block on average.

$^1$H-NMR of the triblock copolymer was performed in D$_2$O on a Bruker Advance III 400 MHz NMR spectrometer. 64 Scans were performed, with a relaxation time between two subsequent pulses of 60 s to allow full relaxation of the protons in the PEO middle-block. The average number of charged groups on the triblock copolymers was determined by comparing the integral values of the peak corresponding to the protons in the PEO middle-block (δ=3.6 ppm) and the peak of the protons of the trimethylamino group (δ=3.2 ppm), taking into account the relative amount of protons per group. An average value of 68 monomers per PEO middle-block was obtained, corresponding to an average of 34 charged monomers per A block. The $^1$H-NMR spectrum of the triblock copolymer is shown in FIG. 1c. The origin of each peak is indicated in the graph.

Example 1.2

Composite Gel Preparation

To prepare the coated silica nanoparticles, Ludox LS 30 (Sigma-Aldrich, 30 wt % in 10 mM salt solution in water) colloidal silica particles, with a particle radius of $\approx 7.5$ nm and a surface charge of $\approx -0.08$ C/m$^2$, were mixed with a 10 mM salt solution of poly(vinylpyrrolidone) K25 (PVP) (Fluka, M$_w$=40 kg mol$^{-1}$). The amount of PVP in solution was twice the amount that is expected to physically adsorb, based on reflectometry measurements ($\Gamma$max$\approx 0.6$ mg/m$^2$). The soaking of particles in the PVP solution was done at least 1 day before further use of the coated particles to saturate the silica surface with PVP. The composition of the Ludox solvent was used as solvent in all samples, which is 0.002% (w/w) of chloride as NaCl and 0.010% (w/w) of sulfate as Na$_2$SO$_4$. The pH of the solvent was adjusted to pH=7.0±0.2 to minimize the chance of hydrolysis of the ester bonds in the end blocks of the triblock copolymers.

The PVP-coated silica particles were subsequently added to a 10 mM salt triblock copolymer solution. The sample was shortly vortexed directly after addition of the silica particles. The samples were left to rest for 1 day before starting rheological measurements. DLS measurements were started directly after mixing, without any resting period.

Example 1.3

Rheometry

Rheological measurements were performed on an Anton Paar Physica MCR 301 stress-controlled rheometer. A cone and plate geometry was used with either a cone diameter of 50 or 25 mm. Both geometries have an angle of 1°. The effect of solvent evaporation was minimized by utilizing the solvent blocker system (Anton Paar), which ensures a completely sealed sample environment. Temperatures of both the plate and the hood were Peltier controlled at 20° C. Sample loading was performed with caution; a limiting normal force of 0.5 N was set. Rheological measurements were started 2 h after sample loading to allow the sample to relax the loading stresses. A 5 mL gel sample was kept in a closed container, out of which small aliquots were taken to investigate the development of the complex composite gel in time.

Oscillatory measurements were performed at 0.05% strain, which was checked to be in the linear viscoelastic regime for the entire time window studied. Creep tests were performed at a shear stress of 0.1 Pa. The reported viscosity values were obtained after smoothing the creep compliance data, fitting the curve locally to a power law.

Example 1.4

Dynamic Light Scattering

Dynamic light scattering experiments were performed on an ALV-125 goniometer, combined with a Cobolt Samba-300 DPSS laser (300 mW) operating at a wavelength of 532 nm, an ALV optical fiber with a diameter of 50 µm, an ALV/SO single photon detector, and an ALV5000/60X0 external correlator. Temperature was controlled at 20° C. using a Haake F8-C35 thermostatic bath. The angle of detection was 90°, corresponding to a scattering vector q=3.1×107 m$^{-1}$, except for the q-dependent measurement described in the main text, where the intensity correlation function was recorded at 20-60°, in steps of 10°. Because of the high scattering intensity, an optical density filter of 10% was used to ensure linearity of the detector. A total sample volume of 1 mL was measured at different moments in time. Intensity correlation functions were recorded for different time intervals, corrected for the specific measurement setup and shifted if necessary to obtain an autocorrelation function that starts to decay at unity for the smallest correlation times. To remove microbubbles, samples were centrifuged gently before DLS measurements. Measurements that were still influenced by small bubbles were identified by a strong increase in the scattered intensity and were not included in the analysis.

From a dynamic light scattering experiment the intensity correlation function, $g^{(2)}(t)$, is obtained, from which the autocorrelation is computed as function $g^{(1)}(t)$:

$$g^{(1)}(t) = \sqrt{\frac{g^{(2)}(t)-1}{A}} \quad (1)$$

where A is an experimental parameter close to unity. The contribution of multiple scattering events to the autocorrelation function was assumed to be small, as a diffusive cone around the laser beam was not observed and the measured decay times were found to scale with $q^{-2}$.

Example 1.5

Small-Angle X-Ray Scattering

Small-angle X-ray scattering (SAXS) experiments were carried out at the Adolphe Merkle Institute on a pinhole camera (S-Max 3000) from Rigaku Innovative Technologies equipped with a microfocus X-ray source operating at wavelength $\lambda$=1.5405 Å (Cu K$\alpha$ emission) and a Triton 2-dimensional multiwire gas detector. The sample was loaded into a reusable 2 mm quartz capillary cell and subsequently placed into a sample holder thermostated to 20° C. by an external Julabo CF 30 circulator. The data are radially averaged and corrected for transmission, background scattering, and detector efficiency and converted into absolute scattering cross sections using water as a calibration standard. The SASfit program developed by Kohlbrecher and co-workers at the Paul Scherrer Institute (PSI) was used for data analysis.

Example 2

Results and Discussion

Example 2.1

Sample Preparation

To avoid irreversible aggregation of the particles, the silica nanoparticles were coated with a layer of poly(vinylpyrrolidone) (PVP), a neutral hydrophilic polymer. Coating of the particles was achieved by physical adsorption of PVP, which is known to be essentially irreversible on silica surfaces. The PVP coating also prevents physical adsorption of the poly(ethylene oxide) (PEO) middle block because the adsorption energy of PEO is much lower than that of PVP. The adsorbed amount of PVP on the silica surface is ≈0.5 mg $m^{-2}$.

To physically bind the negatively charged silica nanoparticles in a transient network, an ABA triblock copolymer was employed which had a PEO middle block and two strongly charged cationic poly(trimethylaminoethyl methacrylate) (PTMAEMA) end blocks (see FIG. 1a). Mixing this triblock copolymer with a solution of precoated silica nanoparticles can lead to transient network formation, as schematically illustrated in FIG. 1b.

The silica particle concentration and the triblock copolymer concentration are the two major factors that influence transient network formation. The effect of varying these two parameters by making samples of different composition was investigated. To prepare a sample-spanning transient network, the concentration of potential nodes must be high enough to facilitate a percolating structure. The silica particle concentration can be above approximately 10% (w/w) to cause any appreciable increase in viscosity. As expected, the viscosity of the gels increased with increasing silica particle concentration, because a higher particle concentration gives more nodes in the transient network. The viscosity decreased with increasing triblock copolymer concentration. This decrease can be caused by an increase in the formation of loops and dangling ends of the triblock copolymer, thereby reducing the number of bridges between the particles. Another possibility is that the particles themselves become repulsive when the particles are overcharged with positive charges.

The driving force for charge-driven association can be strongest at a 1:1 charge ratio. Overdosing the system with positive charge was performed at least three times to result in reasonably transparent gels. At lower triblock copolymer concentrations, the samples were turbid, indicating an inhomogeneous distribution of particles. The turbidity decreases slightly with increasing silica particle concentration. The effects of silica concentration and triblock copolymer concentration on the physical appearance of the gels are summarized in FIG. 2a.

Figure 2A:
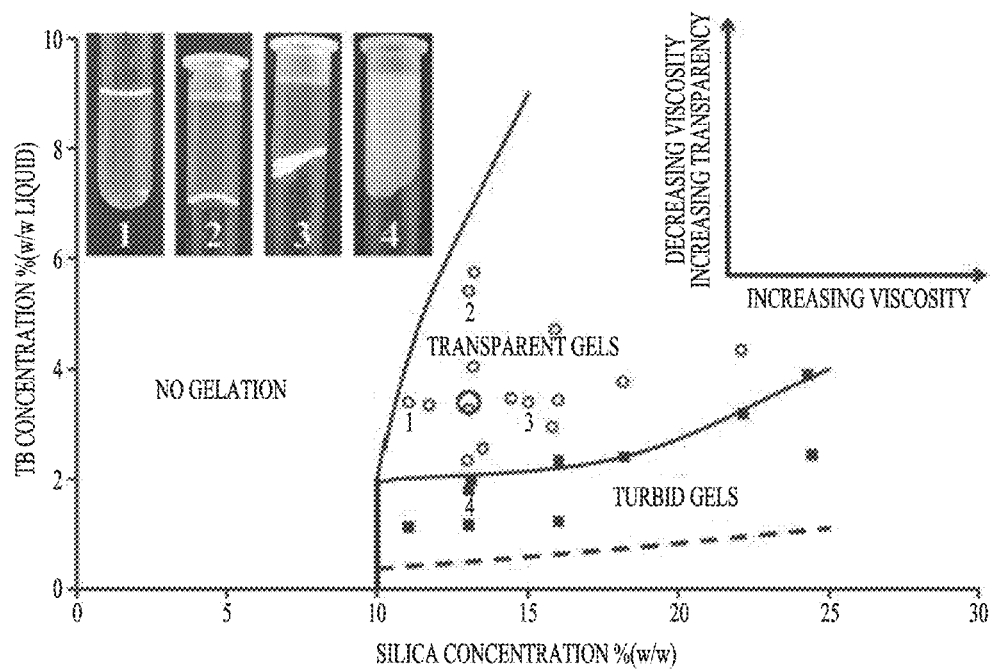
FIG. 2(a) illustrates regions of particle and polymer concentrations where the samples appear as liquids, liquids (+), turbid gels (■), or transparent gels (○), with the numbers in the phase diagram corresponding to data points directly above the numbers and corresponding to the photographs in the left inset, and with the right inset showing the direction of increased transparency and increased viscosity, in accordance with various embodiments.

FIG. 2a is a diagram sketching the regions (particle and polymer concentrations) where the samples appear as liquids (+), turbid gels (■), or transparent gels (○). The calculated dashed line indicates charge stoichiometry between the silica particles and the triblock copolymers. The big circle indicates the sample used for further studies. The inset shows the observed direction of increased transparency and increased or decreased viscosity. The numbers in the phase diagram belong to the data points directly above the numbers and correspond to the photographs of the samples as shown in the inset.

Figure 2B:
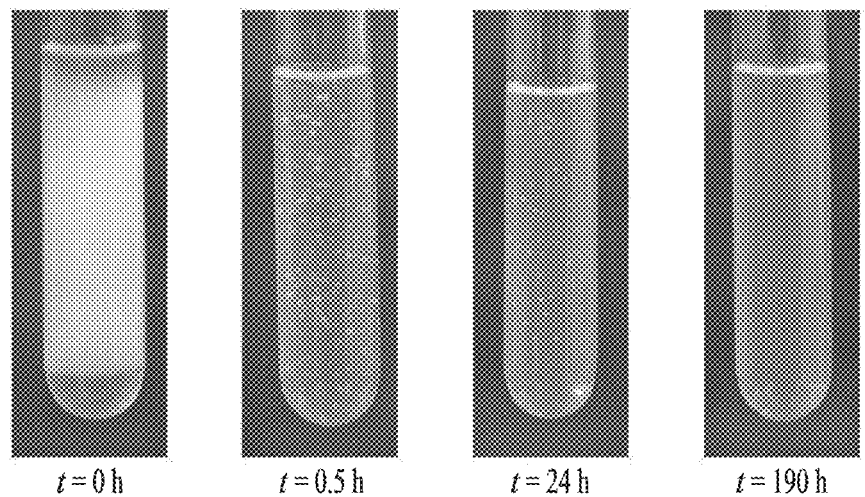
FIG. 2(b) illustrates photographs of composite gels over time, in accordance with various embodiments of the present invention.

The mechanical properties and time evolution of these were further tested gels using a 13% (w/w) silica nanoparticles and 3.4% (w/w) triblock copolymer gel, indicated by the big circle in FIG. 2a. When the coated silica nanoparticles were mixed with an aqueous solution of the ABA triblock copolymer at this composition, a turbid gel was initially obtained, a sign of large-scale inhomogeneities in the sample. Within half an hour the gel becomes almost transparent, indicating that the sample becomes more homogeneous (see FIG. 2b). FIG. 2b shows photographs showing the visual appearance of the complex composite gels in time: (a) immediately after mixing; (b) 30 minutes after mixing; (c) 24 hours after mixing; (d) eight days after mixing. Note that after 24 h the amount of air bubbles that appeared after vortexing has decreased, showing that this gel still has liquid-like properties.

It was assumed that upon the physical binding of a TMAEMA group with an oppositely charged group on the silica surface, counterions from both components are released into the solution. The entropy gain related to this counterion release is an important part of the driving force in charge-driven association. As a result of this counterion release, the salt concentration in the gel rises, to a maximum of 0.1 M for this specific case.

Example 2.2

Gel Structure

Figure 3:
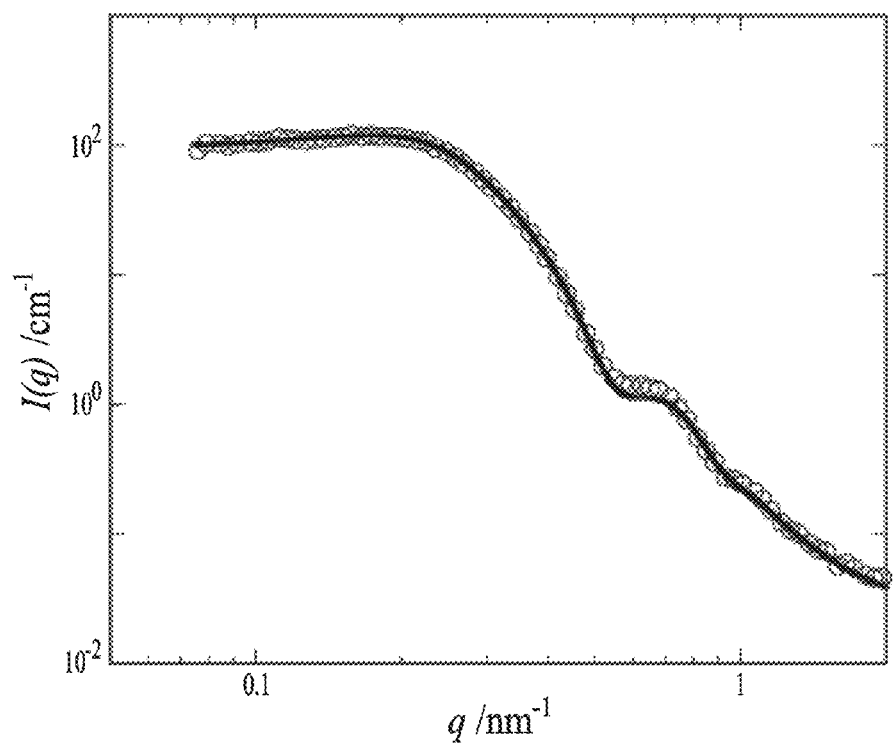
FIG. 3 illustrates a small-angle X-ray scattering curve of a composite gel, in accordance with various embodiments of the present invention.

To probe the structure of the gels, small-angle X-ray scattering (SAXS) measurements were performed on the sample. The results are given in FIG. 3. FIG. 3 illustrates a small-angle X-ray scattering curve of the complex composite gel containing 13% (w/w) silica nanoparticles and 3.4% (w/w) triblock copolymer, 40 days after preparation. The thick line is a fit to the data obtained by the SASfit program, using a form factor for polydisperse spheres (R=7.6±1.2 nm) and an effective hard-sphere structure factor (with a hard-sphere radius of 11.9 nm and an effective volume fraction of 0.11). The scattering curve can be fitted reasonably well with a form factor for polydisperse (Gaussian) spheres of radius R=7.6±1.2 nm, together with an effective hard-sphere structure factor. This gives an effective hard-sphere radius of 12 nm, meaning that the polymer layer around the particles is approximately 3-6 nm thick. This agrees reasonably well with the hydrodynamic radius of 13 nm of a polymer-coated particle found with dynamic light scattering (see below). Cryo-SEM images of the same samples suggest that on larger length scales (around 100 nm) the gels are not completely homogeneous. In the SAXS data, evidence could not be found for such large-scale density variations because the lowest q value that was accessed in the SAXS measurements was 0.08 $nm^{-1}$, corresponding to an upper length scale of ≈75 nm, roughly 5 particle diameters.

Example 2.3

Gel Elasticity

Figure 4:
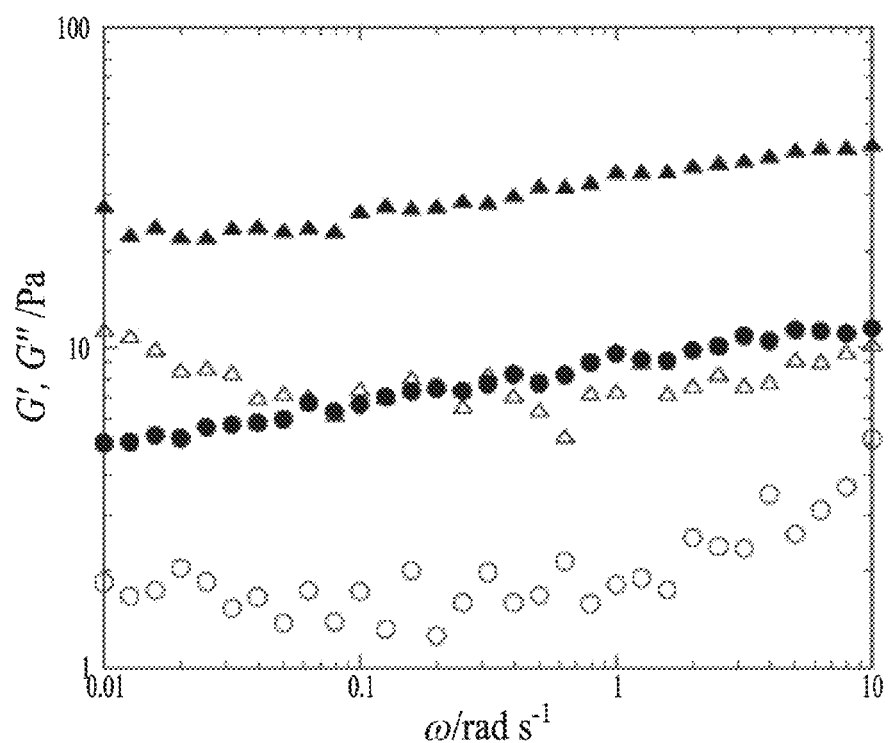
FIG. 4 illustrates a frequency sweep of composite gels, in accordance with various embodiments.

To study the viscoelastic properties of the physical gel, rheological studies were performed. The storage modulus G' of the gel, measured at 1 rad $s^{-1}$, was measured as a function of the age of the sample. For each measurement point, a new sample was taken from a developing gel and the modulus was measured 2 h after sample loading. G' was observed to increase in the first 200 h, from 2 Pa to a final value of ≈8 Pa. FIG. 4 (circles) shows the frequency-dependent viscoelastic moduli for an ~1000 h (43 days) old complex composite gel. Shown are two frequency sweeps, before (circles) and after (triangles) a creep test. Storage moduli are given by filled symbols, and loss moduli are given by the open symbols. The measurements shows that G'>G" over the measured frequency domain. There is a weak frequency dependence and G'>G" over the measured frequency range, indicating that the material behaves solid-like on the investigated time scales.

The final value of the storage modulus was still relatively low, around 10 Pa. This corresponds to roughly 0.02 kT per particle, much lower than values reported for colloidal gels formed by particles that are flocculated due to van der Waals or depletion attractions. In the present case, the sample had a network of particles bridged by the triblock copolymers. In polymeric gels, the value of the storage modulus is ~1 kT per elastically active chain in the network. If every triblock copolymer would act as an elastically active bridge, G' would reach several kPa. What was measured was orders of magnitude lower, meaning that the number of elastically active bridges was only a few percent of the maximum possible amount. This likely means that most polymers form loops or dangling ends. The slow increase in storage modulus that was seen during the first 200 h can then be attributed to an increase of the number of bridging chains in the network. The distribution of particles does not change dramatically during this time. Cryo-SEM images taken from a 24 h old sample are not visually different from those of a 72 days old sample.

Example 2.5

Dynamics of the Gels

Figure 5:
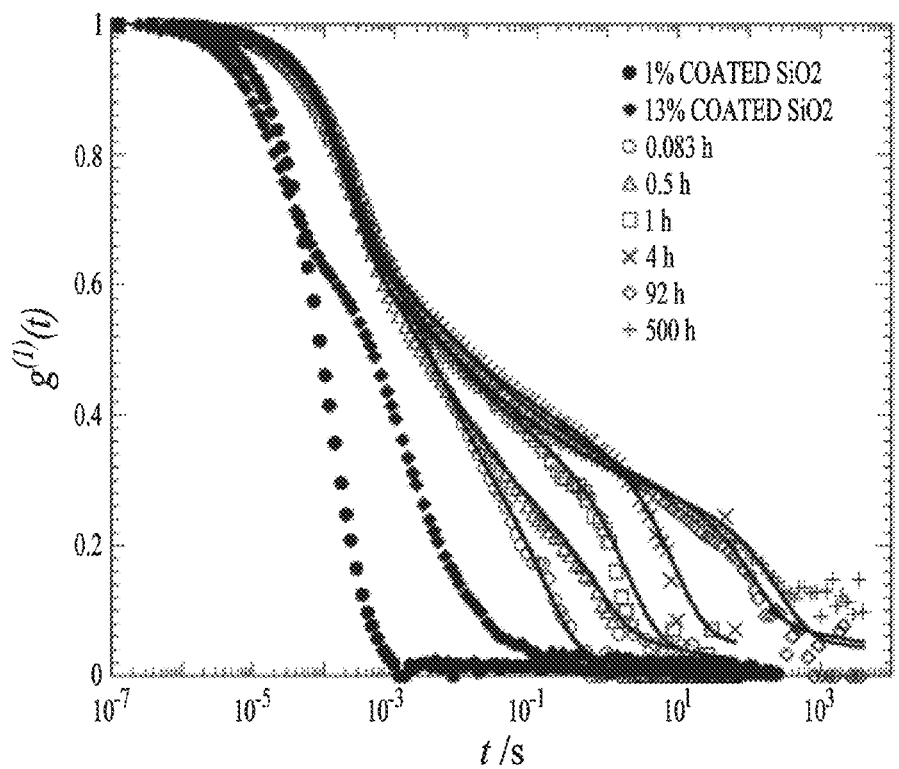
FIG. 5 illustrates temporal evolution of complex composite gels, in accordance with various embodiments.

To study the relaxation dynamics of the complex composite gels, dynamic light scattering (DLS) was used. The autocorrelation functions of a complex composite gel at 0.1 M salt, for different times after preparation, are shown in FIG. 5. FIG. 5 illustrates the temporal evolution of the complex composite gels. Autocorrelation functions of reference samples containing 1% (w/w) PVP-coated silica particles (●) or 13% (w/w) PVP-coated silica particles (♦) and a complex composite gel sample with 0.1 M NaCl at 0.083 (○), 0.5 (Δ), 1 (□), 4 (×), 92 (◊), and 500 h (+) after preparation. Only 50% of the data points are shown. The intensity correlation functions at 0.083, 0.5, 1, and 4 h after preparation have been recorded for 5 min. The other intensity correlation functions were recorded for 4 h. Reference samples were recorded for 0.33 h. Two reference samples are also shown; 1% (w/w) PVP-coated silica particles and 13% (w/w) PVP-coated silica particles. The first shows a single-exponential decay, originating from the diffusive motion of the particles at this concentration. From a fit of the correlation function, a hydrodynamic radius of 13 nm was obtained, slightly larger than the effective hardsphere radius obtained by SAXS. At 13% (w/w) of PVP-coated silica particles, the autocorrelation function does not decay as a single-exponential function anymore because the particles interact with each other and hinder free diffusion. In the samples with triblock copolymer the decay of the autocorrelation function is shifted strongly to longer times, indicating a significant slowing down of the particles by the bridging polymers. Three regimes in the autocorrelation function can be distinguished: first an initial exponential decay, then a second regime in which the autocorrelation function decays gradually, approximately as a power law, and finally a slower exponential decay. The following empirical function can fit the autocorrelation functions:

$$g^{(1)}(t)=A\exp(-t/\tau_f)+B(1+t/\tau_i)^{-\alpha/2}+C\exp(-t/\tau_l) \quad (2)$$

where $\tau_f$ is the relaxation time associated with the initial (fast) dynamics, $\tau_i$ is the time where the power-law regime begins, and $\tau_l$ is the longest relaxation time. From the fits estimates can be obtained for the relaxation times of the gel at different aging times. The fits to the autocorrelation function are displayed as lines in FIG. 5.

The initial decay time $\tau_f$ in the complex composite gel is longer than for the reference samples. This indicates that the short-time motion of the particles is restricted by the presence of the triblock copolymers. It is independent of the time after preparation, however, as all autocorrelation curves overlap at short correlation times. Furthermore, $\tau_f$ is proportional to $q^{-2}$, indicating a diffusive process. This fast relaxation process can be attributed to the local diffusive motion of the particles within the "cage" formed by the neighboring particles. The observation that this diffusive motion does not become slower as the gel ages indicates that the particles remain stable and do not aggregate into larger clusters over time.

At longer times, particle mobility is restricted because the particles are trapped in a network. Further relaxation therefore implies a network reorganization processes, which includes the breaking and reformation of bridges between the particles, and desorption of polyelectrolyte blocks from the particle surface. The gradual, power-law decay of the autocorrelation function means that there is a wide distribution of relaxation times associated with the reorganization of the network. The power-law exponent α decreases with the time after preparation, from close to 1 immediately after preparation, to ≈0.3 after 24. This means that the relaxation spectrum of the gel widens as the gel ages. The value of α in the fully developed gel is similar to values found by others for randomly cross-linked polymer networks.

Figure 6:
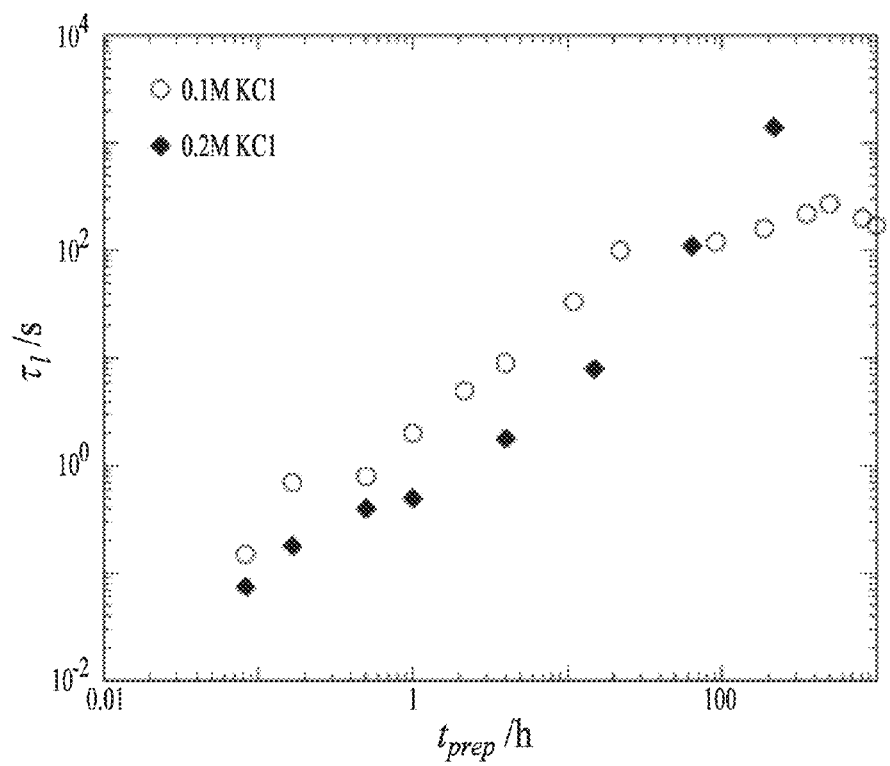
FIG. 6 illustrates values for the longest relaxation time, $\tau_l$, as a function of time after sample preparation, $t_{prep}$, for various composite gels, in accordance with various embodiments.

The final exponential decay is associated with the longest relaxation time of the network. The fact that the autocorrelation function decays to zero means that the gel is ergodic and the network is able to flow. In other words, the bonds between the triblock copolymers and the nanoparticles are reversible, indicating a physical gel. While the initial decay is independent of time after preparation, the longest relaxation time increases strongly with time after preparation (see FIG. 5). In FIG. 6 the development of the longest relaxation time, $\tau_l$, is plotted as a function of time after sample preparation, $t_{prep}$. Shown are the values for the 0.1 M KCl gel (○) and the 0.2 M KCl gel (♦). From this Figure it can be seen that the longest relaxation time keeps on increasing as the sample ages, initially (during the first 20 h) approximately linearly and more slowly in later stages.

On the basis of the rheological and light scattering data, a mechanism can be proposed to explain the temporal evolution of the gels, wherein embodiments of the present invention are not limited to any particular mechanism. Initially, right after mixing triblock copolymer and particles, the sample can include large clusters of bridged particles that are dispersed inhomogeneously throughout the sample, causing the turbidity. The bond between the triblock copolymer end blocks and the silica particles is initially relatively weak due to the intervening PVP layer. This enables the particles to redistribute in a more homogeneous way, thereby decreasing the turbidity and increasing the modulus.

Gradually, the cationic blocks of the triblock copolymer adsorb more strongly on the particle surface, possibly by displacing the PVP from the surface. Hence, as the sample ages, the particles and polymers find continuously deeper local minima of the free energy, from which it becomes continuously harder to escape. This leads to an increase of the longest relaxation time of the network and to a broadening of the relaxation spectrum (as indicated by a decrease of the power-law exponent α).

Example 2.6

Effect of Salt

Figure 7:
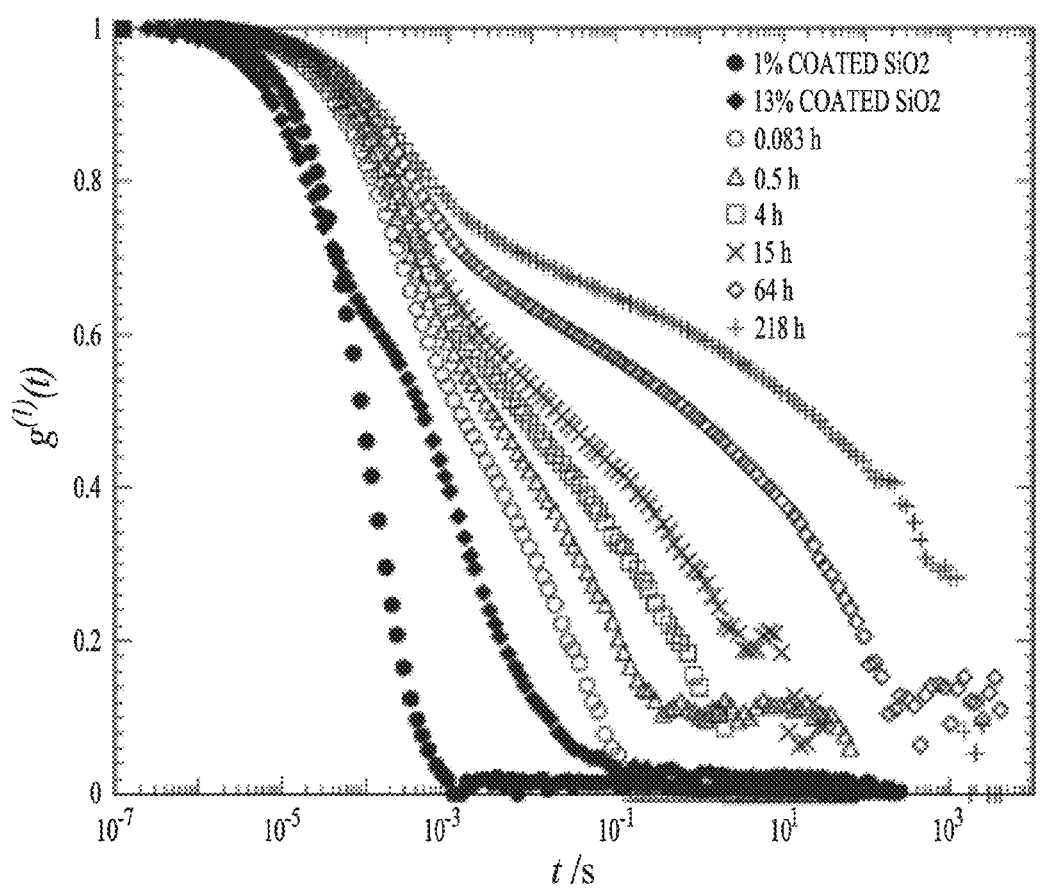
FIG. 7 illustrates autocorrelation functions of reference samples containing 1% (w/w) PVP-coated silica particles (●) or 13% (w/w) PVP-coated silica particles (♦) and a 0.2 M complex composite gel samples at various times after preparation, in accordance with various embodiments.

Electrostatic interactions between the triblock copolymer and the silica particles were assumed to be responsible for binding the particles in the transient network. As salt ions can screen these electrostatic interactions, addition of extra salt is may enhance the dynamics of the bonds between the oppositely charged components, as has been shown before for electrostatically assembled systems. To test this hypothesis, a complex composite gel was prepared with the same ratio of components, except that the salt concentration was doubled to 0.2 M. The addition of extra salt decreased the time it took to reach the almost transparent appearance, indicating that electrostatic interactions are indeed important in the complex composite gels. This sample was investigated with DLS, and the results of these measurements are displayed in FIG. 7. FIG. 7 illustrates autocorrelation functions of reference samples containing 1% (w/w) PVP-coated silica particles (●) or 13% (w/w) PVP-coated silica particles (◆) and a 0.2 M complex composite gel sample at 0.083 (○), 0.5 (Δ), 4 (□), 15 (×), 64 (◇), and 218 h (+) after preparation. The intensity correlation functions at 0.083, 0.5, 4, and 15 h after preparation have been recorded for 5 min. The other intensity correlation functions were recorded for 4 h. Reference samples were recorded for 0.33 h.

The shape of the autocorrelation functions for the 0.2 M salt gel are qualitatively the same as for the 0.1 M salt gel. The longest relaxation time for this salt concentration is also plotted in FIG. 6. It can be seen that, initially, it is lower in the 0.2 M salt sample than in the 0.1 M salt sample, which is as expected because salt is known to plasticize electrostatic assemblies. However, after ~70 h, the longest relaxation time keeps on increasing and becomes even longer than for 0.1 M salt. At the same time, the intensity of the scattered light and the fluctuations therein can be observed to increase over time at 0.2 M salt, while they are stable at 0.1 M salt. This suggests that the high salt concentration leads to irreversible flocculation of the particles. This can also be seen from the relaxation time of the fast process, associated with the short-time diffusive behavior of the particles. In contrast to what was observed for the 0.1 M salt sample, the fast relaxation time at 0.2 M salt is not constant, but increases as the sample ages. This increase can be attributed to the slow aggregation of the particles. This aggregation prevents melting the gel completely by the addition of salt.

Example 2.7

Stress-Induced Aging

Figure 8A:
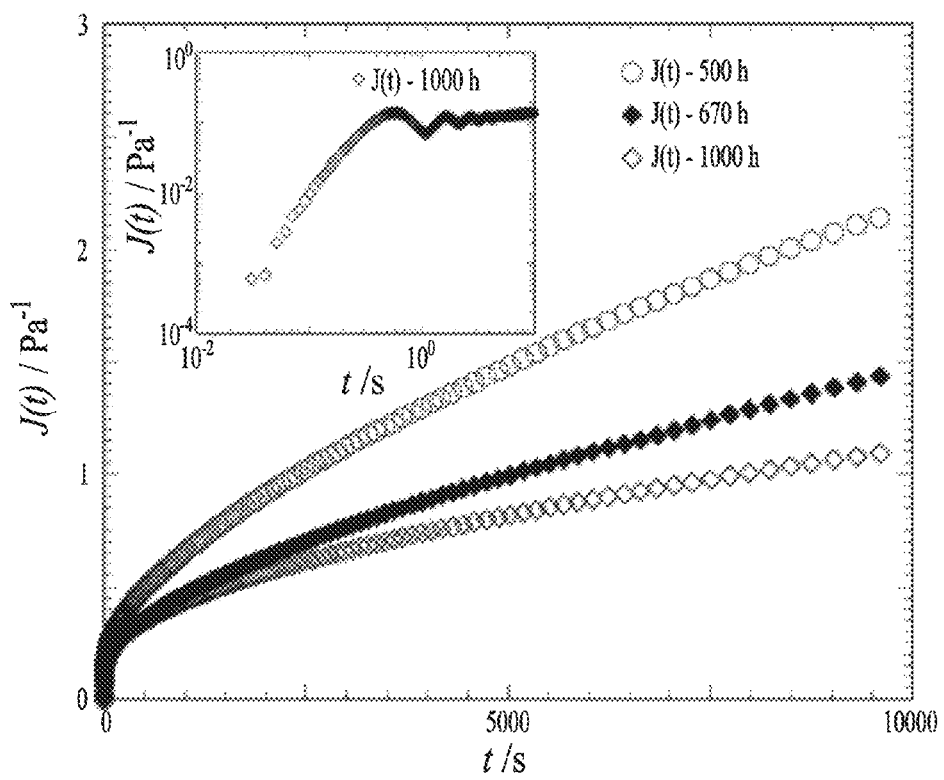
FIG. 8(a) illustrates creep tests measured at a fixed shear stress of 0.1 Pa, but at different aging times, for various composite gels, in accordance with various embodiments.

The complex composite gel can slowly age, as evidenced by an increase of the elastic modulus and the relaxation time. To measure the time evolution of the viscosity, creep tests were performed. A constant shear stress of $\sigma=0.1$ Pa was applied to each sample and the creep compliance of each sample was measured as a function of time, J(t). FIG. 8a shows creep curves for three samples of approximately 500, 670, and 1000 h after preparation. FIG. 8(a) illustrates creep tests measured at a fixed shear stress of 0.1 Pa, but at different aging times. Shown is the creep compliance as a function of time. Symbols are explained in the graph. The graph displays only 10% of the data points. The inset shows the initial response of the 1000 h old sample on a log-log scale. Damped oscillations in the first 10 s of the creep test could be seen. The 1000 h sample is the same as studied in FIG. 4.

Qualitatively all three samples respond the same to the applied stress. There is an almost instantaneous response of the material, around 0.25 Pa$^{-1}$ associated with the elasticity of the gel. The corresponding elastic modulus of ~4 Pa agrees with the values of FIG. 4. In the first 10 s after applying the shear stress, the measured deformation oscillates. Although present in all samples, for reasons of clarity only one response is shown in the inset of FIG. 8a. This "creep ringing" phenomenon is seen also in creep tests of paste-like materials and is caused by the coupling between sample elasticity and instrument inertia.

After the initial response, the gel continues to deform under the applied stress up to times of 104 s. The creep compliance decreases less rapidly for the older samples, indicating that the viscosity has increased during aging of the sample. This is in agreement with the observed increase of the relaxation time (FIG. 6).

Figure 8B:
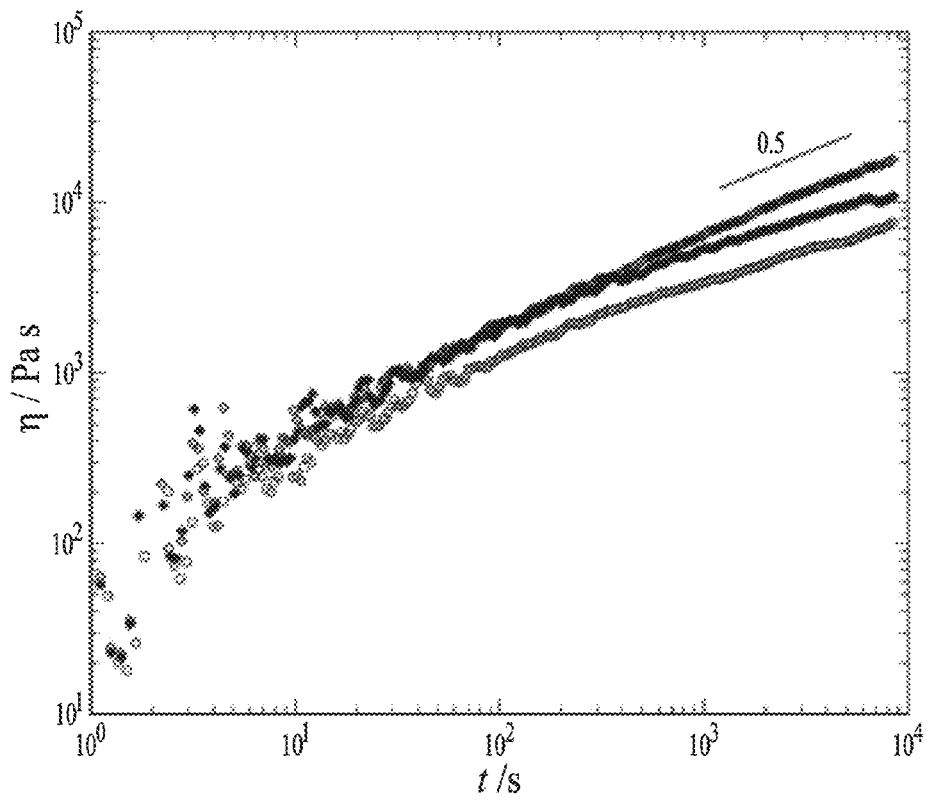
FIG. 8(b) illustrates time evolution of the apparent viscosity as a stress of 0.1 Pa is applied to various composite gel samples, in accordance with various embodiments.

After almost 3 h of creep, the creep curves do not yet show a clear linear increase of the creep compliance with time. The shear viscosity was calculated from the slope of the creep curve. The results for the three samples are shown in FIG. 8b. FIG. 8(b) illustrates the time evolution of the apparent viscosity as a stress of 0.1 Pa is applied. The apparent viscosity keeps on increasing, approximately as $\eta \sim t^{0.5}$. The three curves correspond to samples of different age, from bottom to top: 500, 670, and 1000 h. The initial viscosity values are very noisy because of the creep ringing effect. FIG. 8b shows that the viscosity of the samples increases with age, apparently without leveling off, even after 104 s. This continued viscosity increase points to shear-induced changes in the sample. This is confirmed by the increase of the storage and loss moduli measured by a frequency sweep 2 h after the creep experiment. The result of this frequency sweep is also plotted in FIG. 4 and shows an approximate factor of 4 increase in moduli values as compared to the frequency sweep before the creep test. Thus, the applied stress enhanced the rate of aging of the gels. Such a stress-enhanced aging has been reported before for thixotropic gels. The applied stress probably helps the particles and polymer chains to escape from local free energy minima (which involves the desorption of polymer chains from the particles) and to find new, even deeper, minima.

Example 2.8

Drying of the Composite Gel

The gel sample was not completely transparent (see, FIG. 2b). To test whether the gel maintains its turbidity when applied as a coating, a simple drying test was performed. Upon drying, the lump of gel shrinks, through the evaporation of water. This shrinking causes a flattening of the drop, which then becomes a thin layer of gel. Because of the decrease in volume, the components in the gel are concentrated, leading to a more or less homogeneous distribution of the particles in the gel. This in turn decreases the scattering of the drying gel, which became fully transparent after 2 h of drying (see, FIG. 2b).

Example 2.9

Gel Rheometry

Figure 9:
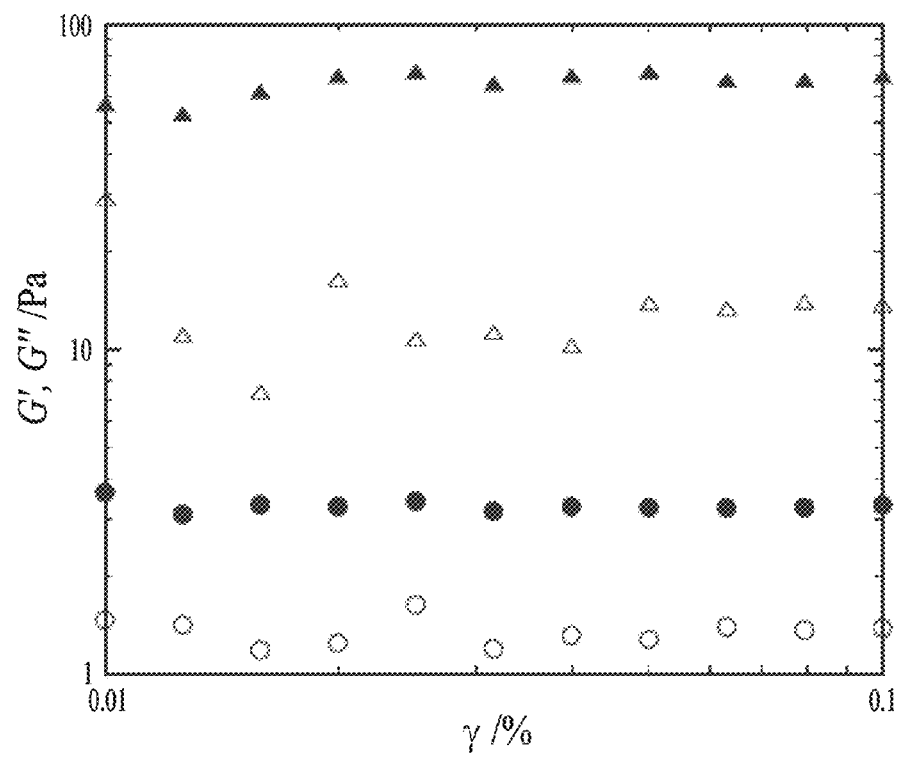
FIG. 9 illustrates results of amplitude sweep experiments of various composite samples, in accordance with various embodiments.

FIG. 9 shows the results for two amplitude sweeps of a complex composite gel, 24 hours after preparation (circles) and 1000 hours after preparation (triangles). FIG. 9 illustrates results of amplitude sweep experiments, showing the independence of G' (filled symbols) and G" (open symbols) on strains between 0.01% and 0.1% irrespective of sample age. Data obtained at a frequency of 1 rad/s. Gel samples are 24 hours old (circles) and 1000 hours old (triangles). Both the storage and loss moduli are constant over the measured strain domain, indicating that strains up to 0.1% are in the linear viscoelastic regime, independent of sample age. Frequency sweeps reported in the main text are recorded at a strain amplitude of 0.05%.

Figure 10:
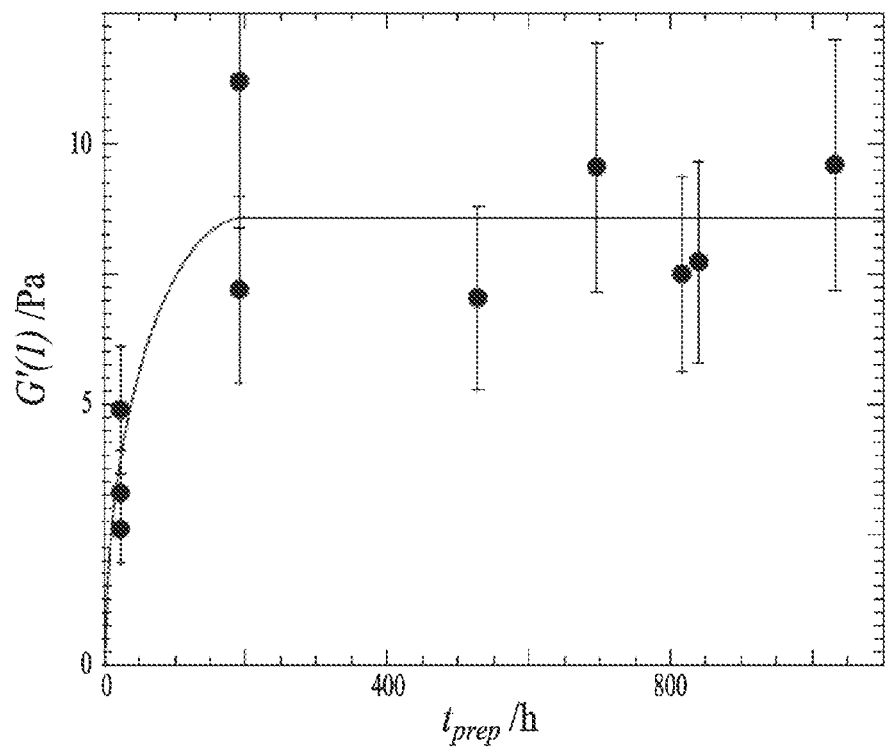
FIG. 10 illustrates development of the storage modulus at 1 rad s$^{-1}$ as a function of time after sample preparation, in accordance with various embodiments.

FIG. 10 shows the development of the storage modulus, measured at 1 rad/s as a function of time after sample preparation. The modulus increases during the first 200 hours and then reaches a more or less constant value of approximately 8 Pa.

Example 2.10

Summary

An aqueous physical gel including a transient network of precoated inorganic silica nanoparticles and ABA triblock copolymers was formed, without causing irreversible particle aggregation. In this open network, the particle surfaces are frequently found 5-10 nm apart from each other, which is the appropriate spacing for a triblock copolymer to bridge two particles. Electrostatic interactions were shown to be the likely driving force for the association between the positively charged end-blocks and the negatively charged silica nanoparticles. The complex composite gels age slowly in time and this aging can be enhanced by applying stress.

The base materials that were used are cheap and the triblock copolymer can be easily produced on scales of hundreds of grams. The properties of the gels can be tuned in a wide range by varying additional parameters. FIG. 2a shows how the appearance and the viscosity of the gel change when the concentrations of the two components are changed. Other parameters that can influence the gel properties are the pH (by its effect on the surface charge of the silica particles), the length of the different blocks of the triblock copolymer, and the size of the nanoparticles.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments.

The present invention provides for the following exemplary embodiments, the numbering of which is not to be construed as designating levels of importance:

Embodiment 1 provides a method of treating a subterranean formation, the method comprising: obtaining or providing a composition comprising a linear triblock copolymer and inorganic particles, the composition having a viscosity; at least one of shearing and heating the composition, to increase the viscosity of the composition; and contacting the composition with a subterranean material downhole.

Embodiment 2 provides the method of Embodiment 1, wherein increasing the viscosity comprises at least one of heat-thickening and shear-thickening.

Embodiment 3 provides the method of any one of Embodiments 1-2, wherein increasing the viscosity comprises at least one of heat-gelling and shear-gelling.

Embodiment 4 provides the method of any one of Embodiments 1-3, wherein the shearing is carried out at least one of above ground and downhole by at least one of mixing, stirring, drilling, bubbling, vibrating, agitating, and pumping.

Embodiment 5 provides the method of any one of Embodiments 1-4, wherein the heating is carried out at least one of above ground and downhole.

Embodiment 6 provides the method of any one of Embodiments 1-5, wherein the shearing or heating to increase the viscosity of the composition occurs before putting the composition downhole.

Embodiment 7 provides the method of any one of Embodiments 1-6, wherein the shearing or heating to increase the viscosity of the composition occurs after putting the composition downhole.

Embodiment 8 provides the method of Embodiment 7, wherein the shearing or heating to increase the viscosity of the composition occurs before the contacting with the subterranean material.

Embodiment 9 provides the method of any one of Embodiments 7-8, wherein the shearing or heating to increase the viscosity of the composition occurs after the contacting with the subterranean material.

Embodiment 10 provides the method of any one of Embodiments 1-9, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the contacting of the subterranean material and the composition comprises contacting the subterranean material and the mixture.

Embodiment 11 provides the method of Embodiment 10, wherein the cementing fluid comprises Portland cement, pozzolana cement, gypsum cement, high alumina content cement, slag cement, silica cement, or a combination thereof.

Embodiment 12 provides the method of any one of Embodiments 1-11, wherein at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 13 provides the method of any one of Embodiments 1-12, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 14 provides the method of any one of Embodiments 1-13, wherein the composition is used as a barrier pill.

Embodiment 15 provides the method of any one of Embodiments 1-14, wherein the composition is used as a packer fluid.

Embodiment 16 provides the method of any one of Embodiments 1-15, wherein the composition is used as a lost circulation material.

Embodiment 17 provides the method of any one of Embodiments 1-17, wherein the inorganic particles comprise silica, clay, zeolite, Portland cement, pozzolana cement, gypsum cement, high alumina content cement, slag cement, silica cement fly ash, metakaolin, shale, microspheres, pozzolan lime, or a combination thereof.

Embodiment 18 provides the method of any one of Embodiments 1-18, wherein the inorganic particles comprise silica.

Embodiment 19 provides the method of any one of Embodiments 1-19, wherein the inorganic particles comprise nanoparticles.

Embodiment 20 provides the method of any one of Embodiments 1-20, wherein the diameter of the inorganic particles is about 0.001 nm to about 1 cm.

Embodiment 21 provides the method of any one of Embodiments 1-21, wherein the diameter of the inorganic particles is about 0.1 nm to about 1000 nm.

Embodiment 22 provides the method of any one of Embodiments 1-22, wherein the diameter of the inorganic particles is about 1 nm to about 20 nm.

Embodiment 23 provides the method of any one of Embodiments 1-23, wherein the inorganic particles are stabilizer-treated prior to the obtaining or providing of the composition.

Embodiment 24 provides the method of any one of Embodiments 1-24, wherein the inorganic particles comprise a stabilizer.

Embodiment 25 provides the method of Embodiment 24, wherein the stabilizer comprises a coating around each inorganic particle.

Embodiment 26 provides the method of any one of Embodiments 24-25, wherein the stabilizer comprises a neutral hydrophilic polymer.

Embodiment 27 provides the method of any one of Embodiments 24-26, wherein the stabilizer comprises sodium citrate, gallic acid, sodium dodecyl sulfate, cetyl trimethyl ammonium bromide (CTAB), gelatin, D-sorbitol, polyvinylpyrrolidone (PVP), polyvinyl alcohol (PVA), poly(methylvinylether) (PMVE), or a combination thereof.

Embodiment 28 provides the method of any one of Embodiments 24-27, wherein the inorganic particles comprise polyvinylpyrrolidone-coated silica particles having a diameter of about 0.1 nm to about 100 nm.

Embodiment 29 provides the method of any one of Embodiments 1-28, wherein the linear triblock copolymer has the structure A-$L^1$-B-$L^1$-A, wherein A is a polyalkenylene block comprising at least one ionic group, B is a polyalkenylene or poly(alkylene oxide) block, and $L^1$ is a bond or a linking group.

Embodiment 30 provides the method of Embodiment 29, wherein $L^1$ is a covalent bond between the A block and the B block.

Embodiment 31 provides the method of any one of Embodiments 29-30, wherein $L^1$ independently at each occurrence is selected from the group consisting of ($C_1$-$C_{30}$) alkylene, —O—($C_0$-$C_{30}$)alkylene-, —C(O)—($C_0$-$C_{30}$)alkylene-, —NH—($C_0$-$C_{30}$)alkylene-, —C(O)O—($C_0$-$C_{30}$)alkylene-, —OC(O)—($C_0$-$C_{30}$)alkylene-, —OC(O)O($C_0$-$C_{30}$)alkylene-, —C(O)NH—($C_0$-$C_{30}$)alkylene-, —OC(O)NH—($C_0$-$C_{30}$)alkylene-, —NHC(O)—($C_0$-$C_{30}$)alkylene-, and —NHC(O)NH—($C_0$-$C_{30}$)alkylene-, wherein each ($C_0$-$C_{30}$) alkylene is independently unsubstituted or further substituted with at least one J, and J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)$N(R)_2$, OC(O)$N(R)_2$, C(S)$N(R)_2$, $(CH_2)_{0-2}$NHC(O)R, N(R)N(R)C(O)R, N(R)N(R)C(O)OR, N(R)N(R)C(O)$N(R)_2$, $N(R)SO_2R$, $N(R)SO_2N(R)_2$, N(R)C(O)OR, N(R)C(O)R, N(R)C(S)R, N(R)C(O)$N(R)_2$, N(R)C(S)$N(R)_2$, N(C(O)R)C(O)R, N(OR)R, C(=NH)$N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, wherein R independently at each occurrence is selected from the group consisting of hydrogen, ($C_1$-$C_{10}$)alkyl, ($C_4$-$C_{10}$)cycloalkyl, ($C_4$-$C_{10}$)cycloalkyl($C_1$-$C_{10}$)alkyl, ($C_6$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl.

Embodiment 32 provides the method of Embodiment 31, wherein $L^1$ is —OC(O)—($C_0$-$C_{30}$)alkylene-, wherein ($C_0$-$C_{30}$)alkylene is independently unsubstituted or further substituted with at least one J.

Embodiment 33 provides the method of any one of Embodiments 29-32, wherein $L^1$ is —OC(O)—C($R^1$)$_2$—, wherein $R^1$ at each occurrence is independently $C_1$-$C_{10}$ alkyl.

Embodiment 34 provides the method of any one of Embodiments 29-33, wherein $L^1$ is —OC(O)—C($CH_3$)$_2$—, wherein the terminal oxygen atom is directly bound to the B block.

Embodiment 35 provides the method of any one of Embodiments 29-34, wherein B is a poly(alkylene oxide) block having the structure —($R^2$—O)$_m$—$R^2$—, $R^2$ is a $C_1$-$C_{30}$ alkylene group at each occurrence independently unsubstituted or substituted with at least one J, J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)$N(R)_2$, OC(O)$N(R)_2$, C(S)$N(R)_2$, $(CH_2)_{0-2}$NHC(O)R, N(R)N(R)C(O)R, N(R)N(R)C(O)OR, N(R)N(R)C(O)$N(R)_2$, $N(R)SO_2R$, $N(R)SO_2N(R)_2$, N(R)C(O)OR, N(R)C(O)R, N(R)C(S)R, N(R)C(O)$N(R)_2$, N(R)C(S)$N(R)_2$, N(C(O)R)C(O)R, N(OR)R, C(=NH)$N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, wherein R independently at each occurrence is selected from the group consisting of hydrogen, ($C_1$-$C_{10}$) alkyl, ($C_4$-$C_{10}$)cycloalkyl, ($C_4$-$C_{10}$)cycloalkyl($C_1$-$C_{10}$)alkyl, ($C_6$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, and m is about 1 to 5000.

Embodiment 36 provides the method of Embodiment 35, wherein $R^2$ is an unsubstituted $C_1$-$C_{10}$ alkylene group.

Embodiment 37 provides the method of any one of Embodiments 35-36, wherein B is a poly(ethylene oxide).

Embodiment 38 provides the method of any one of Embodiments 35-37, wherein B is a poly(propylene oxide).

Embodiment 39 provides the method of any one of Embodiments 35-38, wherein m is about 10 to about 1000.

Embodiment 40 provides the method of any one of Embodiments 35-39, wherein m is about 100 to about 300.

Embodiment 41 provides the method of any one of Embodiments 29-40, wherein B is a polymerized $C_4$-$C_{10}$ dialkene block, wherein the $C_4$-$C_{10}$ dialkene has at least two double bonds conjugated to one another, wherein the $C_4$-$C_{10}$ dialkene at each occurrence is independently unsubstituted or substituted with at least one J, J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, C(S)N$(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, $N(C(O)R)C(O)R$, N(OR)R, $C(=NH)N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, wherein R independently at each occurrence is selected from the group consisting of hydrogen, ($C_1$-$C_{10}$)alkyl, ($C_4$-$C_{10}$) cycloalkyl, ($C_4$-$C_{10}$)cycloalkyl($C_1$-$C_{10}$)alkyl, ($C_6$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, and m is about 1 to 5000.

Embodiment 42 provides the method of Embodiment 41, wherein each B is independently selected from the group consisting of a poly(butadiene) block and a poly(isoprene) block.

Embodiment 43 provides the method of any one of Embodiments 41-42, wherein m is about 10 to about 1000.

Embodiment 44 provides the method of any one of Embodiments 41-43, wherein m is about 100 to about 300.

Embodiment 45 provides the method of any one of Embodiments 29-44, wherein A at each occurrence is independently selected from the group consisting of —($CR^3R^4$—C($R^3$)$_2$)$_n$—, —(C($R^3$)$_2$—$CR^3R^4$)$_n$—, and —[{$CR^3R^4$—C($R^3$)$_2$}$_{n1}${C($R^3$)$_2$—$CR^3R^4$}$_{n2}$]—, $R^4$ is -$L^2$-$R^5$-$R^6$, wherein $L^2$ is a linking group, $R^3$ is independently at each occurrence ($C_1$-$C_{30}$)hydrocarbyl, $R^5$ at each occurrence is independently $C_1$-$C_{30}$ hydrocarbylene, each of $R^3$ and $R^5$ at each occurrence are independently unsubstituted or substituted with at least one J, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, C(S)N$(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, $N(C(O)R)C(O)R$, N(OR)R, C(=NH)$N(R)_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, wherein R independently at each occurrence is selected from the group consisting of hydrogen, ($C_1$-$C_{10}$)alkyl, ($C_4$-$C_{10}$)cycloalkyl, ($C_4$-$C_{10}$)cycloalkyl($C_1$-$C_{10}$)alkyl, ($C_6$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, $R^6$ at each occurrence is independently an ionic group, n is about 1 to about 5000, and n1+n2=n.

Embodiment 46 provides the method of Embodiment 45, wherein $L^2$ independently at each occurrence is selected from the group consisting of —O—, —C(O)—, —NH—, —C(O)O—, —OC(O)—, —OC(O)O—, —C(O)NH—, —OC(O)NH—, —NHC(O)—, and —NHC(O)NH—.

Embodiment 47 provides the method of any one of Embodiments 45-46, wherein $L^2$ is —C(O)O—, wherein the terminal oxygen atom is directly bound to $R^5$.

Embodiment 48 provides the method of any one of Embodiments 45-47, wherein $R^3$ at each occurrence is independently selected from the group consisting of H and $C_1$-$C_{10}$ alkyl.

Embodiment 49 provides the method of any one of Embodiments 45-48, wherein $R^3$ at each occurrence is independently selected from the group consisting of H and methyl.

Embodiment 50 provides the method of any one of Embodiments 45-49, wherein A is independently at each occurrence selected from the group consisting of —(C($CH_3$)$R^4$—$CH_2$)$_n$—, —($CH_2$—C($CH_3$)$R^4$)$_n$—, and —[{C($CH_3$)$R^4$—$CH_2$}$_{n1}${C($R^3$)$_2$—C($CH_3$)$R^4$}$_{n2}$]—.

Embodiment 51 provides the method of any one of Embodiments 45-50, wherein $R^5$ is $C_1$-$C_{30}$ hydrocarbylene, at each occurrence independently unsubstituted or substituted with at least one J.

Embodiment 52 provides the method of any one of Embodiments 45-51, wherein $R^5$ is independently at each occurrence $C_1$-$C_{10}$ alkylene.

Embodiment 53 provides the method of any one of Embodiments 45-52, wherein $R^5$ is selected from the group consisting of ethylene and propylene.

Embodiment 54 provides the method of any one of Embodiments 45-53, wherein $R^6$ at each occurrence is independently selected from the group consisting of —$N^+$($R^7$)$_3$, —S(O)$_2$O$^-$, —C(O)O$^-$, —P(O)(O$R^7$)O$^-$, and —P(O)O$^-$, wherein $R^7$ at each occurrence is independently selected from the group consisting of $C_1$-$C_{10}$ alkyl and H.

Embodiment 55 provides the method of any one of Embodiments 45-54, wherein $R^6$ is trimethylammonium.

Embodiment 56 provides the method of any one of Embodiments 45-55, wherein A at each occurrence is independently selected from the group consisting of $R^8$—($CR^3R^4$—C($R^3$)$_2$)$_n$—, $R^8$—(C($R^3$)$_2$—$CR^3R^4$)$_n$—, and $R^8$—[{$CR^3R^4$—C($R^3$)$_2$}$_{n1}${C($R^3$)$_2$—$CR^3R^4$}$_{n2}$]—, $R^8$ is independently at each occurrence selected from the group consisting of H, Br, Cl, I, F, a substituted or unsubstituted organic group, and an A block from the same or from another linear triblock copolymer optionally with —O—O— disposed therebetween.

Embodiment 57 provides the method of Embodiment 56, wherein $R^8$ is independently at each occurrence selected from the group consisting of H, Br, Cl, I, F, —O—O—, ($C_1$-$C_{30}$)hydrocarbyl, ($C_1$-$C_{30}$)heterocyclyl, —O—($C_1$-$C_{30}$)hydrocarbyl, —O—($C_1$-$C_{30}$)heterocyclyl, —O—O—($C_1$-$C_{30}$)hydrocarbyl, and —O—O—($C_1$-$C_{30}$)heterocyclyl, wherein $R^8$ at each occurrence are independently unsubstituted or substituted with at least one J.

Embodiment 58 provides the method of any one of Embodiments 56-57, wherein $R^8$ is independently at each occurrence selected from the group consisting of H, Br, $CH_3$, pyridyl, phenyl, —O—CH₃, —O-pyridyl, —O-phenyl, —O—O—CH₃, —O—O-pyridyl, and —O—O-phenyl.

Embodiment 59 provides the method of any one of Embodiments 45-58, wherein n is about 2 to about 500.

Embodiment 60 provides the method of any one of Embodiments 45-59, wherein n is about 2 to about 200.

Embodiment 61 provides the method of any one of Embodiments 1-60, wherein the linear triblock copolymer has the structure A-L¹-B-L¹-A, L¹ is —OC(O)—C(R¹)₂—, wherein R¹ is C₁-C₁₀ alkyl, A at each occurrence is independently selected from the group consisting of —(CR³R⁴—C(R³)₂)ₙ—, —(C(R³)₂—CR³R⁴)ₙ—, and —[{CR³R⁴—C(R³)₂}ₙ₁{C(R³)₂—CR³R⁴}ₙ₂]—, R³ at each occurrence is independently selected from the group consisting of H and C₁-C₁₀ alkyl, R⁴ is -L²-R⁵—R⁶, L² is —C(O)O—, wherein the terminal oxygen atom is directly bound to R⁵, R⁵ is independently at each occurrence C₁-C₁₀ alkylene, R⁶ is —N⁺(R⁷)₃, wherein R⁷ at each occurrence is independently C₁-C₁₀ alkyl, B is selected from the group consisting of a poly(alkylene oxide) block having the structure —(R²—O)ₘ—R²—, wherein R² is a C₁-C₁₀ alkylene group, and a polymerized C₄-C₁₀ dialkene block, wherein the C₄-C₁₀ dialkene has at least two double bonds conjugated to one another, m is about 10 to about 1000, n is about 2 to about 500, and n1+n2=n.

Embodiment 62 provides the method of any one of Embodiments 1-61, wherein the inorganic particles comprise polyvinylpyrrolidone-coated silica particles having a diameter of about 0.1 nm to about 100 nm, the linear triblock copolymer has the structure A-L¹-B-L¹-A, L¹ is —OC(O)—C(CH₃)₂—, wherein the terminal oxygen atom is directly bound to the B block, A at each occurrence is independently selected from the group consisting of R⁸—(C(CH₃)R⁴—CH₂)ₙ—, R⁸—(CH₂—C(CH₃)R⁴)ₙ—, and R⁸—[{C(CH₃)R⁴—CH₂}ₙ₁{C(R³)₂—C(CH₃)R⁴}ₙ₂]—, R⁴ is -L²-R⁵-R⁶, L² is —C(O)O—, wherein the terminal oxygen atom is directly bound to R⁵, R⁵ is ethylene, R⁶ is —N⁺(CH₃)₃, R⁸ is independently at each occurrence selected from the group consisting of H, Br, Cl, I, F, a substituted or unsubstituted organic group, and an A block from the same or from another linear triblock copolymer optionally with —O—O— disposed therebetween, B is a poly(alkylene oxide) block having the structure —(R²—O)ₘ—R²—, wherein R² is selected from the group consisting of an ethylene group and a propylene group, m is about 10 to about 1000, n is about 2 to about 500, and n1+n2=n.

Embodiment 63 provides a method of treating a subterranean formation, the method comprising: obtaining or providing a composition comprising a linear triblock copolymer and inorganic particles, the composition having a viscosity; at least one of shearing and heating the composition, to increase the viscosity of the composition; and contacting the composition with a subterranean material downhole; wherein the inorganic particles comprise polyvinylpyrrolidone-coated silica particles having a diameter of about 0.1 nm to about 100 nm, the linear triblock copolymer has the structure A-L¹-B-L¹-A, L¹ is —OC(O)—C(CH₃)₂—, wherein the terminal oxygen atom is directly bound to the B block, A at each occurrence is independently selected from the group consisting of R⁸—(C(CH₃)R⁴—CH₂)ₙ—, R⁸—(CH₂—C(CH₃)R⁴)ₙ—, and R⁸—[{C(CH₃)R⁴—CH₂}ₙ₁{C(R³)₂—C(CH₃)R⁴}ₙ₂]—, R⁴ is -L²-R⁵-R⁶, L² is —C(O)O—, wherein the terminal oxygen atom is directly bound to R⁵, R⁵ is ethylene, R⁶ is —N⁺(CH₃)₃, R⁸ is independently at each occurrence selected from the group consisting of H, Br, Cl, I, F, a substituted or unsubstituted organic group, and an A block from the same or from another linear triblock copolymer optionally with —O—O— disposed therebetween, B is a poly(alkylene oxide) block having the structure —(R²—O)ₘ—R²—, wherein R² is selected from the group consisting of an ethylene group and a propylene group, m is about 10 to about 1000, n is about 2 to about 500, and n1+n2=n.

Embodiment 64 provides a method of treating a subterranean formation, the method comprising: obtaining or providing a composition comprising a linear triblock copolymer and inorganic particles, the composition having a viscosity; at least one of shearing and heating the composition, to increase the viscosity of the composition; and contacting the composition with a subterranean material downhole; wherein the inorganic particles comprise polyvinylpyrrolidone-coated silica particles having a diameter of about 0.1 nm to about 100 nm, the linear triblock copolymer comprises the structure

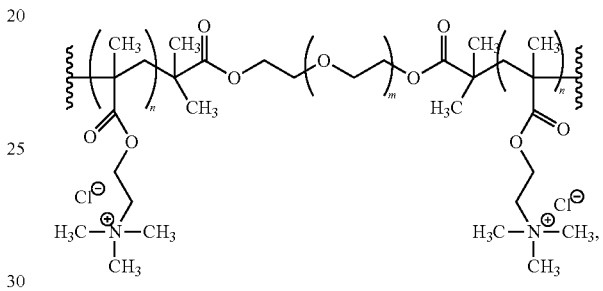

m is about 10 to about 1000, and n is about 2 to about 500.

Embodiment 65 provides a method of treating a subterranean formation, the method comprising: obtaining or providing a composition that is at least one of a shear-thickenable, heat-thickenable, shear-thickened, and heat-thickened, comprising a linear triblock copolymer and inorganic particles; and contacting the composition with a subterranean material downhole.

Embodiment 66 provides a composition for treatment of a subterranean formation comprising: at least one polymer comprising a linear triblock copolymer and inorganic particles; and a drilling fluid, stimulation fluid, fracturing fluid, spotting fluid, clean-up fluid, production fluid, completion fluid, remedial treatment fluid, abandonment fluid, pill, acidizing fluid, a cementing fluid, a packer fluid, or a combination thereof.

Embodiment 67 provides the composition of Embodiment 66, wherein the composition is at least one of shear-thickened, heat-thickened, shear-thickenable, and heat-thickenable.

Embodiment 68 provides a method for preparing a composition for treating a subterranean formation, the method comprising: obtaining or providing a composition comprising a linear triblock copolymer and inorganic particles, the composition having a viscosity; and applying at least one of heat and shear to the composition, to increase the viscosity of the composition.

Embodiment 69 provides the method of any one of Embodiments 64-68, further comprising combining the composition with at least one of a drilling fluid, stimulation fluid, fracturing fluid, spotting fluid, clean-up fluid, production fluid, completion fluid, remedial treatment fluid, abandonment fluid, pill, acidizing fluid, a cementing fluid, a packer fluid, and a combination thereof.

Embodiment 70 provides the apparatus or method of any one or any combination of Embodiments 1-69 optionally configured such that all elements or options recited are available to use or select from.

What is claimed is:

1. A method of treating a subterranean formation, the method comprising:
    at least one of shearing and heating a composition comprising a linear triblock copolymer and inorganic particles bridged by the linear triblock copolymer, the composition having a viscosity, to increase the viscosity of the composition, wherein the linear triblock copolymer has the structure A-$L^1$-B-$L^1$-A wherein A is a polyalkenylene block comprising at least one ionic group, B is a polyalkenylene or poly(alkylene oxide) block, and $L^1$ is a bond or a linking group; and
    placing the composition in the subterranean formation between a first fluid having a first density and a second fluid having a second density, wherein the second density is lower than the first density, and the composition increases in viscosity in response to a pressure differential between the first fluid and the second fluid.

2. The method of claim 1, wherein the shearing is carried out at least one of above ground and downhole by at least one of mixing, stirring, drilling, bubbling, vibrating, agitating, and pumping.

3. The method of claim 1, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing of the composition in the subterranean formation comprises placing the mixture in the subterranean formation.

4. The method of claim 3, wherein the cementing fluid comprises Portland cement, pozzolana cement, gypsum cement, high alumina content cement, slag cement, silica cement, or a combination thereof.

5. The method of claim 1, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

6. The method of claim 1, wherein the composition is used as a barrier pill.

7. The method of claim 1, wherein the composition is used as a packer fluid.

8. The method of claim 1, wherein the composition is used as a lost circulation material.

9. The method of claim 1, wherein the inorganic particles comprise silica, clay, zeolite, Portland cement, pozzolana cement, gypsum cement, high alumina content cement, slag cement, silica cement fly ash, metakaolin, shale, microspheres, pozzolan lime, or a combination thereof.

10. The method of claim 1, wherein the diameter of the inorganic particles is about 0.001 nm to about 1 cm.

11. The method of claim 1, wherein the inorganic particles comprise a stabilizer.

12. The method of claim 1, wherein $L^1$ independently at each occurrence is selected from the group consisting of ($C_1$-$C_{30}$)alkylene, —O—($C_0$-$C_{30}$)alkylene-, —C(O)—($C_0$-$C_{30}$)alkylene-, —NH—($C_0$-$C_{30}$)alkylene-, —C(O)O—($C_0$-$C_{30}$)alkylene-, —OC(O)—($C_0$-$C_{30}$)alkylene-, —OC(O)O—($C_0$-$C_{30}$)alkylene-, —C(O)NH—($C_0$-$C_{30}$)alkylene-, —OC(O)NH—($C_0$-$C_{30}$)alkylene-, —NHC(O)—($C_0$-$C_{30}$)alkylene-, and —NHC(O)NH—($C_0$-$C_{30}$)alkylene-, wherein each ($C_0$-$C_{30}$)alkylene is independently substituted or unsubstituted.

13. The method of claim 1, wherein B is a poly(alkylene oxide) block having the structure —($R^2$—O)$_m$—$R^2$—,
    $R^2$ is a $C_1$-$C_{30}$ alkylene group at each occurrence independently substituted or unsubstituted, and
    m is about 1 to 5000.

14. The method of claim 1, wherein
    B is a polymerized $C_4$-$C_{10}$ dialkene block, wherein the $C_4$-$C_{10}$ dialkene has at least two double bonds conjugated to one another, wherein the $C_4$-$C_{10}$ dialkene at each occurrence is independently substituted or unsubstituted.

15. The method of claim 1, wherein
    A at each occurrence is independently selected from the group consisting of —(CR$^3$R$^4$—C(R$^3$)$_2$)$_n$—, —(C(R$^3$)$_2$—CR$^3$R$^4$)$_n$—, and —[{CR$^3$R$^4$—C(R$^3$)$_2$}$_{n1}${C(R$^3$)$_2$—CR$^3$R$^4$}$_{n2}$]—,
    $R^4$ is -$L^2$-$R^5$-$R^6$, wherein $L^2$ is a linking group, $R^3$ is independently at each occurrence ($C_1$-$C_{30}$)hydrocarbyl, $R^5$ at each occurrence is independently $C_1$-$C_{30}$ hydrocarbylene, each of $R^3$ and $R^5$ at each occurrence are independently substituted or unsubstituted,
    $R^6$ at each occurrence is independently an ionic group,
    n is about 1 to about 5000, and
    n1+n2=n.

16. The method of claim 15, wherein
    A at each occurrence is independently selected from the group consisting of $R^8$—(CR$^3$R$^4$—C(R$^3$)$_2$)$_n$—, $R^8$—(C(R$^3$)$_2$—CR$^3$R$^4$)$_n$—, and $R^8$—[{CR$^3$R$^4$—C(R$^3$)$_2$}$_{n1}${C(R$^3$)$_2$—CR$^3$R$^4$}$_{n2}$]—,
    $R^8$ is independently at each occurrence selected from the group consisting of H, Br, Cl, I, F, a substituted or unsubstituted organic group, and an A block from the same or from another linear triblock copolymer optionally with —O—O— disposed therebetween.

17. The method of claim 1, wherein
    $L^1$ is —OC(O)—C($R^1$)$_2$—, wherein $R^1$ is $C_1$-$C_{10}$ alkyl,
    A at each occurrence is independently selected from the group consisting of —(CR$^3$R$^4$—C(R$^3$)$_2$)$_n$—, —(C(R$^3$)$_2$—CR$^3$R$^4$)$_n$—, and —[{CR$^3$R$^4$—C(R$^3$)$_2$}$_{n1}${C(R$^3$)$_2$—CR$^3$R$^4$}$_{n2}$]—,
    $R^3$ at each occurrence is independently selected from the group consisting of H and $C_1$-$C_{10}$ alkyl,
    $R^4$ is -$L^2$-$R^5$-$R^6$,
    $L^2$ is —C(O)O—, wherein the terminal oxygen atom is directly bound to $R^5$,
    $R^5$ is independently at each occurrence $C_1$-$C_{10}$ alkylene,
    $R^6$ is —N$^+$($R^7$)$_3$, wherein $R^7$ at each occurrence is independently $C_1$-$C_{10}$ alkyl,
    B is selected from the group consisting of
        a poly(alkylene oxide) block having the structure —($R^2$—O)$_m$—$R^2$—, wherein $R^2$ is a $C_1$-$C_{10}$ alkylene group, and
        a polymerized $C_4$-$C_{10}$ dialkene block, wherein the $C_4$-$C_{10}$ dialkene has at least two double bonds conjugated to one another,
    m is about 10 to about 1000,
    n is about 2 to about 500, and
    n1+n2=n.

18. The method of claim 1, wherein
    the inorganic particles comprise polyvinylpyrrolidone-coated silica particles having a diameter of about 0.1 nm to about 100 nm, A at each occurrence is independently selected from the group consisting of $R^8$—$(C(CH_3)R^4$—$CH_2)_n$—, $R^8$—$(CH_2$—$C(CH_3)R^4)_n$—, and $R^8$—$[\{C(CH_3)R^4$—$CH_2\}_{n1}\{C(R^3)_2$—$C(CH_3)R^4\}_{n2}]$—, $R^4$ is -$L^2$-$R^5$-$R^6$, $L^2$ is —C(O)O—, wherein the terminal oxygen atom is directly bound to $R^5$, $R^5$ is ethylene, $R^6$ is —$N^+(CH_3)_3$, $R^8$ is independently at each occurrence selected from the group consisting of H, Br, Cl, I, F, a substituted or unsubstituted organic group, and an A block from the same or from another linear triblock copolymer optionally with —O—O— disposed therebetween, B is a poly(alkylene oxide) block having the structure —$(R^2$—$O)_m$—$R^2$—, wherein $R^2$ is selected from the group consisting of an ethylene group and a propylene group, m is about 10 to about 1000, n is about 2 to about 500, and n1+n2=n.

19. A method of treating a subterranean formation, the method comprising:

at least one of shearing and heating a composition comprising a linear triblock copolymer and inorganic particles, the composition having a viscosity, to increase the viscosity of the composition; and placing the composition in the subterranean formation between a first fluid having a first density and a second fluid having a second density, wherein the second density is lower than the first density, and the composition increases in viscosity in response to a pressure differential between the first fluid and the second fluid; wherein the inorganic particles comprise polyvinylpyrrolidone-coated silica particles having a diameter of about 0.1 nm to about 100 nm, the linear triblock copolymer comprises the structure

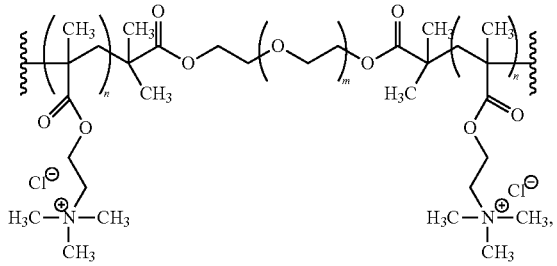

m is about 10 to about 1000, and n is about 2 to about 500.

20. A method of treating a subterranean formation, the method comprising:

placing in the subterranean formation between a first fluid having a first density and a second fluid having a second density, a composition that is at least one of shear-thickenable, heat-thickenable, shear-thickened, and heat-thickened, comprising a linear triblock copolymer and inorganic particles bridged by the linear triblock copolymer, wherein the linear triblock copolymer has the structure A-$L^1$-B-$L^1$-A, wherein A is a polyalkenylene block comprising at least one ionic group, B is a polyalkenylene or poly(alkylene oxide) block, and $L^1$ is a bond or a linking group, wherein the second density is lower than the first density; and increasing a viscosity of the composition in response to a pressure differential between the first fluid and the second fluid.

* * * * *